(12) United States Patent
Kaneko

(10) Patent No.: US 9,097,190 B2
(45) Date of Patent: Aug. 4, 2015

(54) COMBUSTION CONTROL APPARATUS FOR AN INTERNAL COMBUSTION ENGINE

(75) Inventor: Naoya Kaneko, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 5 days.

(21) Appl. No.: 13/639,888

(22) PCT Filed: Apr. 8, 2010

(86) PCT No.: PCT/JP2010/056394
§ 371 (c)(1),
(2), (4) Date: Oct. 8, 2012

(87) PCT Pub. No.: WO2011/125208
PCT Pub. Date: Oct. 13, 2011

(65) Prior Publication Data
US 2013/0042611 A1 Feb. 21, 2013

(51) Int. Cl.
*F02M 25/07* (2006.01)
*F02B 37/00* (2006.01)
(Continued)

(52) U.S. Cl.
CPC ............ *F02D 41/0007* (2013.01); *F02B 17/00* (2013.01); *F02D 13/02* (2013.01); *F02D 13/0226* (2013.01); *F02D 13/0257* (2013.01); *F02D 21/08* (2013.01); *F02D 41/0057* (2013.01); *F02D 41/3023* (2013.01);
(Continued)

(58) Field of Classification Search
CPC ... F02D 41/007; F02D 41/0057; F02D 13/02; F02D 21/08; F02D 13/0203; F02D 13/0207; F02D 13/0265; F02B 17/00

USPC ........... 123/559.1, 430, 348, 90.15; 60/605.2; 701/102, 108, 103
See application file for complete search history.

(56) References Cited

U.S. PATENT DOCUMENTS 5,239,960 A * 8/1993 Sasaki et al. .................. 123/308
5,379,743 A 1/1995 Stokes et al.
(Continued)

FOREIGN PATENT DOCUMENTS

JP 63 162933 7/1988
JP 5 18254 1/1993
(Continued)

OTHER PUBLICATIONS

International Search Report Issued May 18, 2010 in PCT/JP10/56394 Filed Apr. 8, 2010.

*Primary Examiner* — Thai Ba Trieu
*Assistant Examiner* — Jason T Newton
(74) *Attorney, Agent, or Firm* — Oblon, McClelland, Maier & Neustadt, L.L.P.

(57) ABSTRACT

An object of this invention is to provide a technology wherein a stratification of an EGR gas with an air-fuel mixture or a fresh air is achieved and capable of introducing the EGR gas in a large quantity, even when an engine load is high as an operation state of an internal combustion engine. With this invention, when a stratified combustion is performed by introducing the EGR gas, the fresh air is supercharged by a compressor, a fresh air blocking valve is closed to block inflow of the fresh air into a first intake port, and a variable valve mechanism opens a first intake valve before opening of a second intake valve, and, thereafter, opens the second intake valve.

8 Claims, 16 Drawing Sheets

(51) Int. Cl.

| | |
|---|---|
| *F02B 33/00* | (2006.01) |
| *F02B 17/00* | (2006.01) |
| *F02D 13/00* | (2006.01) |
| *F01L 1/34* | (2006.01) |
| *F02D 41/00* | (2006.01) |
| *F02D 13/02* | (2006.01) |
| *F02D 21/08* | (2006.01) |
| *F02D 41/30* | (2006.01) |
| *F02B 23/10* | (2006.01) |
| *F02B 31/00* | (2006.01) |

(52) U.S. Cl.
CPC .... *F02B 2023/108* (2013.01); *F02B 2031/006* (2013.01); *F02D 2041/001* (2013.01); *Y02T 10/144* (2013.01); *Y02T 10/18* (2013.01); *Y02T 10/42* (2013.01); *Y02T 10/47* (2013.01)

(56) References Cited

U.S. PATENT DOCUMENTS

| | | | |
|---|---|---|---|
| 5,896,840 A * | 4/1999 | Takahashi | 123/295 |
| 6,135,088 A | 10/2000 | Duret | |
| 6,318,348 B1 * | 11/2001 | Xu | 123/568.14 |
| 2008/0120013 A1 * | 5/2008 | Yamaguchi et al. | 701/103 |
| 2009/0192699 A1 * | 7/2009 | Bottcher et al. | 701/108 |
| 2009/0308054 A1 * | 12/2009 | Satoh et al. | 60/285 |
| 2010/0095651 A1 * | 4/2010 | Tomoda et al. | 60/278 |
| 2010/0154761 A1 * | 6/2010 | Okumura et al. | 123/676 |

FOREIGN PATENT DOCUMENTS

| | | |
|---|---|---|
| JP | 6 200836 | 7/1994 |
| JP | 10 141148 | 5/1998 |
| JP | 11 182246 | 7/1999 |
| JP | 2004 144052 | 5/2004 |
| JP | 2006 52653 | 2/2006 |
| JP | 2010 19143 | 1/2010 |

* cited by examiner (a) Double helical intake port (b) Double tangential intake port

COMBUSTION CONTROL APPARATUS FOR AN INTERNAL COMBUSTION ENGINE

TECHNICAL FIELD

The present invention relates to a combustion control apparatus for an internal combustion engine that effects stratified combustion in which an EGR gas with an air-fuel mixture or fresh air is stratified (layered) in a combustion chamber.

BACKGROUND ART

There exist EGR apparatuses for circulating a part of an exhaust gas of an internal combustion engine as the EGR gas. With the supply of the EGR gas together with an air-fuel mixture or fresh air to the combustion chamber, decreasing of NOx in the exhaust gas and improving fuel consumption are intended. A technology is known in which the EGR gas with the air-fuel mixture or fresh air is stratified (layered) in the combustion chamber in order to increase the quantity of the EGR gas supplied to the internal combustion engine.

In Patent Document 1, timings of opening and closing of two intake valves are staggered from each other by an opening and closing property changing unit, thereby to cause the EGR gas to flow first into the combustion chamber from an intake port having a swirl control valve, and, thereafter, to cause fresh air to flow into the combustion chamber from the other intake port. Whereby in the combustion chamber, stratification of the EGR gas and fresh air is achieved in which the layer of the EGR gas is a lower layer and the layer of fresh air is an upper layer.

PRIOR ART DOCUMENTS

Patent Documents

Patent Document 1: Japanese Patent Application Laid Open Publication No. 2004-144052
Patent Document 2: Japanese Patent Application Laid Open Publication No. 06(1994)-200836
Patent Document 3: Japanese Patent Application Laid Open Publication No. 63(1988)-162933

SUMMARY OF THE INVENTION

The Problems to be Solved by the Invention

With the technology of Patent Document 1, when an engine load is high as the operation state of the internal combustion engine, fresh air is introduced through both intake ports, and an opening degree of an EGR valve is made smaller thereby to secure the intake quantity supplied to the internal combustion engine. However, in this manner, the EGR gas and fresh air cannot be stratified, and, further, the EGR gas in a large quantity cannot be introduced. As a result, with the technology of Patent Document 1, when the engine load was high as mentioned above, it was not possible to achieve decreasing the NOx in the exhaust gas or improving the fuel consumption.

The present invention was made in view of the above stated circumstances, and an object of the invention is to provide a technology that, in a combustion control apparatus for an internal combustion engine, even when an engine load is high as an operation state of the internal combustion engine, an EGR gas with an air-fuel mixture or fresh air is stratified, and, at the same, the EGR gas in large quantity can be introduced.

Means for Solving the Problems

The present invention adopts the following structure. That is, the present invention is a combustion control apparatus for an internal combustion engine comprising:
a first intake passage and a second intake passage respectively and independently connected with a combustion chamber of the internal combustion engine, and which supply an intake air to the combustion chamber;
an EGR apparatus that circulates an EGR gas comprising a part of an exhaust gas into an EGR gas supply port provided at the first intake passage, from an exhaust passage of the internal combustion engine;
a fresh air blocking unit that blocks inflow of fresh air to the first intake passage;
a supercharger that supercharges the fresh air at the upstream of the first intake passage and the second intake passage;
an opening and closing property changing unit that differentiates the timing of opening of a valve between
a first intake valve that controls intake air which inflows into the combustion chamber from the first intake passage, and
a second intake valve that controls intake air which inflows into the combustion chamber from the second intake passage; and
a control unit that, when the EGR gas is introduced and subjected to stratified combustion, controls to supercharge fresh air by the supercharger, to block inflows of fresh air into the first intake passage by the fresh air blocking unit, to open the first intake valve before opening of the second intake valve by the opening and closing property changing unit, and, thereafter, to open the second intake valve.

Here, the expression of "when the EGR gas is introduced and subjected to stratified combustion" refers to an operation state of the internal combustion engine wherein the EGR gas is stratified with the air-fuel mixture or fresh air in the combustion chamber, thereby to decrease NOx in the exhaust gas and to improve fuel consumption. The term "intake air" is the general term for fresh air, air-fuel mixture and EGR gas which flow into the internal combustion engine. The term "fresh air" refers to fresh air that is supplied externally of the internal combustion engine. The term "air-fuel mixture" refers to a gas comprising a mixture of fresh air and fuel. The term "EGR gas" refers to an inactive gas that is part of the exhaust gas discharged from the internal combustion engine.

With the present invention, when the EGR gas is introduced and subjected to stratified combustion, fresh air is supercharged by the supercharger, inflow of fresh air into the first intake passage is blocked by the fresh air blocking unit, the first intake valve is opened before opening of the second intake valve by the opening and closing property changing unit, and, thereafter, the second intake valve is opened.

In this way, in which inflow of fresh air into the first intake passage is blocked by the fresh air blocking unit, and the first intake valve is opened before opening of the second intake valve by the opening and closing property changing unit, thereby, the EGR gas which flows through the first intake passage flows into the combustion chamber, first. This EGR gas is descending while forming a swirl flow in the combustion chamber. Thereafter, due to opening of the second intake valve by the opening and closing property changing unit, the air-fuel mixture or fresh air which flows through the second intake passage flows into the combustion chamber. This air-fuel mixture or fresh air constitutes a layer formed by a swirl flow thereof above the EGR gas layer which flowed into the combustion chamber, first. Whereby the stratification comprising the EGR gas as the lower layer and the air-fuel mixture or fresh air as the upper layer, can be achieved in the combustion chamber.

When the engine load is high as the operation state of the internal combustion engine, the EGR gas first inflows into the combustion chamber, so that the air-fuel mixture or fresh air which inflows after the EGR gas is difficult to flow into the combustion chamber under a negative pressure due to descending of a piston during an intake stroke. However, with the present invention, fresh air is supercharged by the supercharger, so that the air-fuel mixture or fresh air, which has been supercharged, can flow into the combustion chamber not only during the intake stroke, but also during a compression stroke. Whereby, even when the engine load is high, stratification of the EGR gas and the air-fuel mixture or fresh air can be achieved without deteriorating the intake efficiency, and, at the same time, the EGR gas in large quantity can be introduced.

Further, the air-fuel mixture or fresh air, which inflows after the EGR gas, forms the swirl flow in the combustion chamber during the latter half of the intake stroke, or during the compression stroke. Because of this, the stratified state of the combustion chamber can be easily maintained until ignition in the combustion chamber, so that the effect provided stratification can be exhibited to maximum extent.

The control unit may increase a supercharging pressure of fresh air to be supercharged by the supercharger to a pressure higher than a pressure in a cylinder of the internal combustion engine during a period from closing of the first intake valve to closing of the second intake valve.

In this way, the supercharged air-fuel mixture or fresh air can flow into the combustion chamber without making a reverse flow caused by being forcibly pushed back by the pressure in the cylinder of the internal combustion engine.

The supercharger is a turbocharger, and the EGR apparatus may comprise an EGR passage connecting the exhaust passage at downstream from a turbine of the turbocharger and the EGR gas supply port.

The ERG gas, which is a part of the exhaust gas from the exhaust passage downstream of the turbine of the turbocharger, has its temperature and pressure being dropped, because this EGR gas is after having performed the work of driving the turbine. Here, this EGR gas is introduced into the combustion chamber from the beginning of the intake stroke under the negative pressure due to descending of the piston during the intake stroke. At this time, the sufficient negative pressure is secured so that even this EGR gas with the dropped temperature and pressure can be sufficiently supplied to the combustion chamber. By using this EGR gas, the rise in the intake temperature can be suppressed and also lowering of the charging efficiency caused by the high intake temperature can be suppressed.

The first intake passage and the second intake passage may be a helical port or a tangential port in which the intake air flowed into the combustion chamber forms the swirl flow in the same direction.

Whereby in the combustion chamber, the friction is difficult to be produced at a boundary surface between the lower layer which formed the swirl flow of the EGR gas flowed therein first and the upper layer which formed the swirl flow of the air-fuel mixture or fresh air above the lower layer, and it is difficult for the EGR gas to mix with the air-fuel mixture or fresh air, the stratified state can be maintained to the extent of greatest possible degree.

The control unit, at the time when the EGR gas is introduced and subjected to the stratified combustion, controls such that, when the intake air which flows through the second intake passage during the compression stroke is made to flow into the combustion chamber, controls to supercharge the fresh air by the supercharger, to block inflows of the fresh air into the first intake passage by the fresh air blocking unit, to open the first intake valve by the opening and closing property changing unit before opening of the second intake valve, and, thereafter, to open the second intake valve, or, when it is not necessary, during the compression stroke, to have the intake air flowing through the second intake passage flow into the combustion chamber, the control unit may control not to supercharge the fresh air by the supercharger, control to block inflow of the fresh air into the first intake passage by the fresh air blocking unit, and to open the first intake valve before opening of the second intake valve by the opening and closing property changing unit, and thereafter, to open the second intake valve.

As in the case where the engine load is high as the operation state of the internal combustion engine, having the intake air flowing through the second intake passage during the compression stroke flow into the combustion chamber, it is required to supercharge the fresh air by the supercharger. However, as in the case where the engine load is low as the operation state of the internal combustion engine, where it is not required, during the compression stroke, to have the intake air flowing through the second intake passage flow into the combustion chamber, it is possible to have the air-fuel mixture or fresh air which inflows after the EGR gas flow into the combustion chamber under the negative pressure due to descending of the piston during the intake air stroke. Hence, in the compression stroke, when it is not necessary to have the intake air flowing through the second intake passage flow into the combustion chamber, the fresh air is not supercharged by the supercharger, so that the energy corresponding to that might be used by the supercharger could be reduced from the entire energy thereby to achieve energy saving.

The fresh air blocking unit may switch the intake air to flow through the first intake passage to either the fresh air inflows from the upstream of the first intake passage or the EGR gas inflows from the EGR gas supply port.

In this manner, the EGR gas quantity can be controlled by the timing of opening of the first intake valve and its lift quantity, so that it is not required to provide an EGR valve in the EGR apparatus. As a result, controlling of the EGR gas quantity can be simplified, and, at the same time, the number of parts is reduced by eliminating the EGR valve, so as to achieve a cost-down.

Further, since controlling of the EGR gas quantity is performed by the first intake valve, a distance between the part which controls the EGR gas quantity and the combustion chamber becomes zero, thereby there is no delay of response by the EGR gas, whereby a misfire in the combustion engine and torque fluctuations can be suppressed, and, hence, drivability can be stabilized.

A volume of the first intake passage from the fresh air blocking unit to the combustion chamber is substantially equal to the quantity of the EGR gas supplied to the combustion chamber when making the stratified combustion by introducing the EGR gas in the operation state of at least either in the state where the engine load is high, or in the state where an engine revolution speed is high, and the control unit, when switching from the stratified combustion to a non-stratified combustion where a requesting torque is high and the EGR gas is not introduced, controls to switch the intake air to flow through the first intake passage to the fresh air inflows from the upstream of the first intake passage by the fresh air blocking unit, when a cylinder, which first enters into the intake stroke after the switching request, starts to flow the intake air into the combustion chamber, and, thereafter, upon completion of flowing the intake air into the combustion chamber in the first one cycle of the cylinders other than the above-mentioned cylinder, the opening and closing property of the first intake valve and the second intake valve may be changed by the opening and closing property changing unit.

Whereby, only the combustion of one complete cycle of all cylinders after the switching request achieves the stratified combustion, and, thereafter, the fresh air flows through the first intake passage, thereby from the next and subsequent combustions become the non-stratified combustion. Thus, the combustion shifts from the stratified combustion to the non-stratified combustion without substantially causing the response delay, the misfire in the internal combustion engine, the torque fluctuations and fluctuations in steps of torque.

The control unit, when the non-stratified combustion is made in the state, where the engine load is low and the EGR gas is not introduced therein, may maintain the first intake valve in the closed state by the opening and closing property changing unit.

In this way, when the non-stratified combustion is made in the state where the engine load of the internal combustion engine is low and the EGR gas is not introduced therein, the second intake valve, which is the other intake valve, is opened to allow the air-fuel mixture or the fresh air to flow therein. Whereby, a strong swirl is formed in the combustion chamber and the combustion is stabilized.

Then, when the non-stratified combustion is switched to the stratified combustion in which the EGR gas is introduced, the first intake valve is opened to allow the EGR gas to flow therein from the first intake passage, and also the second intake valve is opened, the same as before the switching, to allow the air-fuel mixture or the fresh air to flow into the combustion chamber. Since there is no change in the quantity of the air-fuel mixture or the fresh air before and after the switching, shifting from the non-stratified combustion to the stratified combustion can be performed without causing fluctuations in the steps of torque.

Effects of the Invention

According to the present invention, in the combustion control apparatus for an internal combustion engine, even when the engine load is high as the operation state of the internal combustion engine, the stratification of the EGR gas and the air-fuel mixture or the fresh air can be achieved, and, at the same time, the EGR gas can be introduced in a large quantity.

BEST MODES OF CARRYING OUT OF THE INVENTION

Hereinafter, a description will be made of specific embodiments of the present invention.

Embodiment 1

(Internal Combustion Engine)

Figure 1:
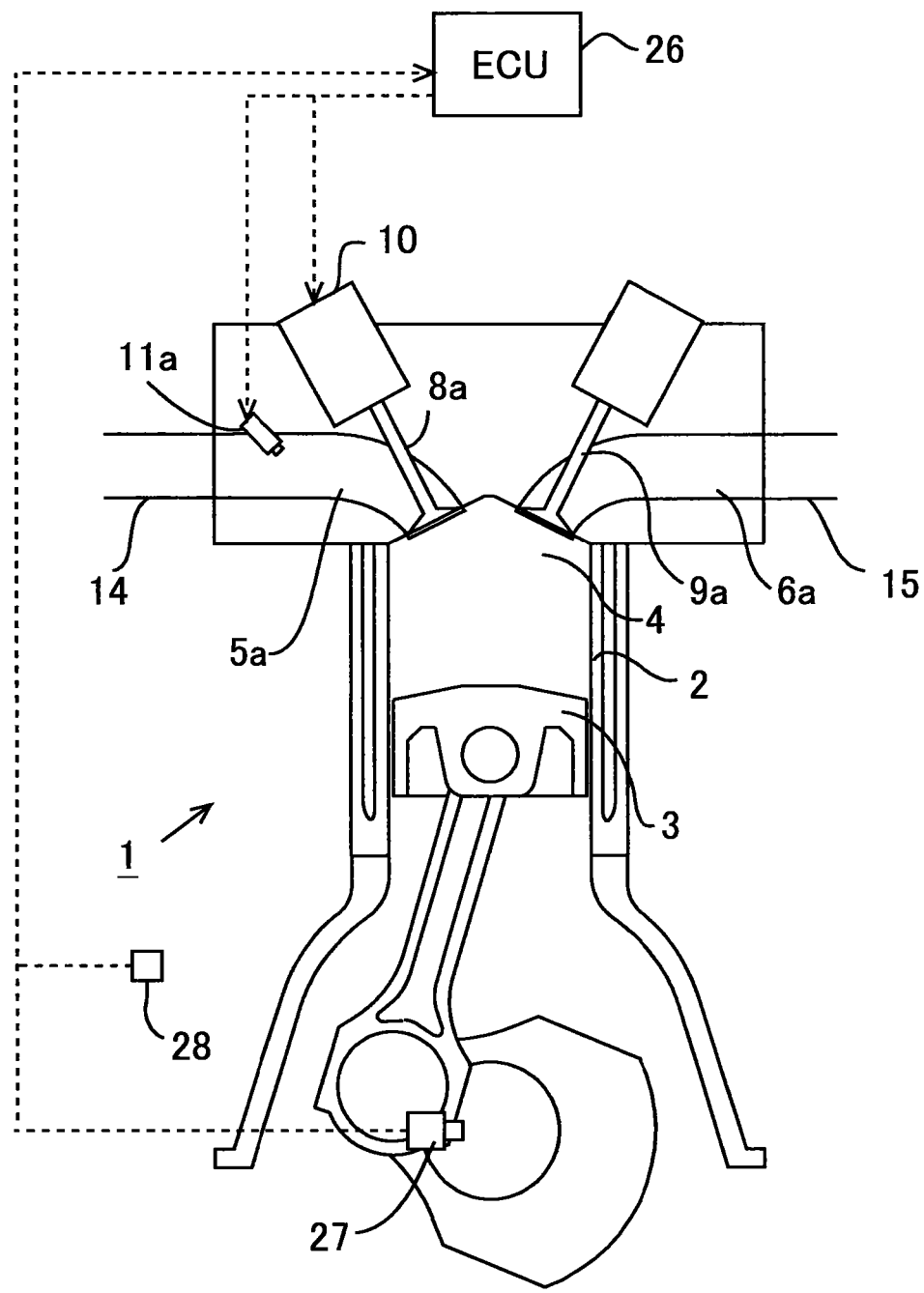
[FIG. 1] A diagram showing a schematic structure of an internal combustion engine according to an Embodiment 1 of the present invention.
Figure 2:
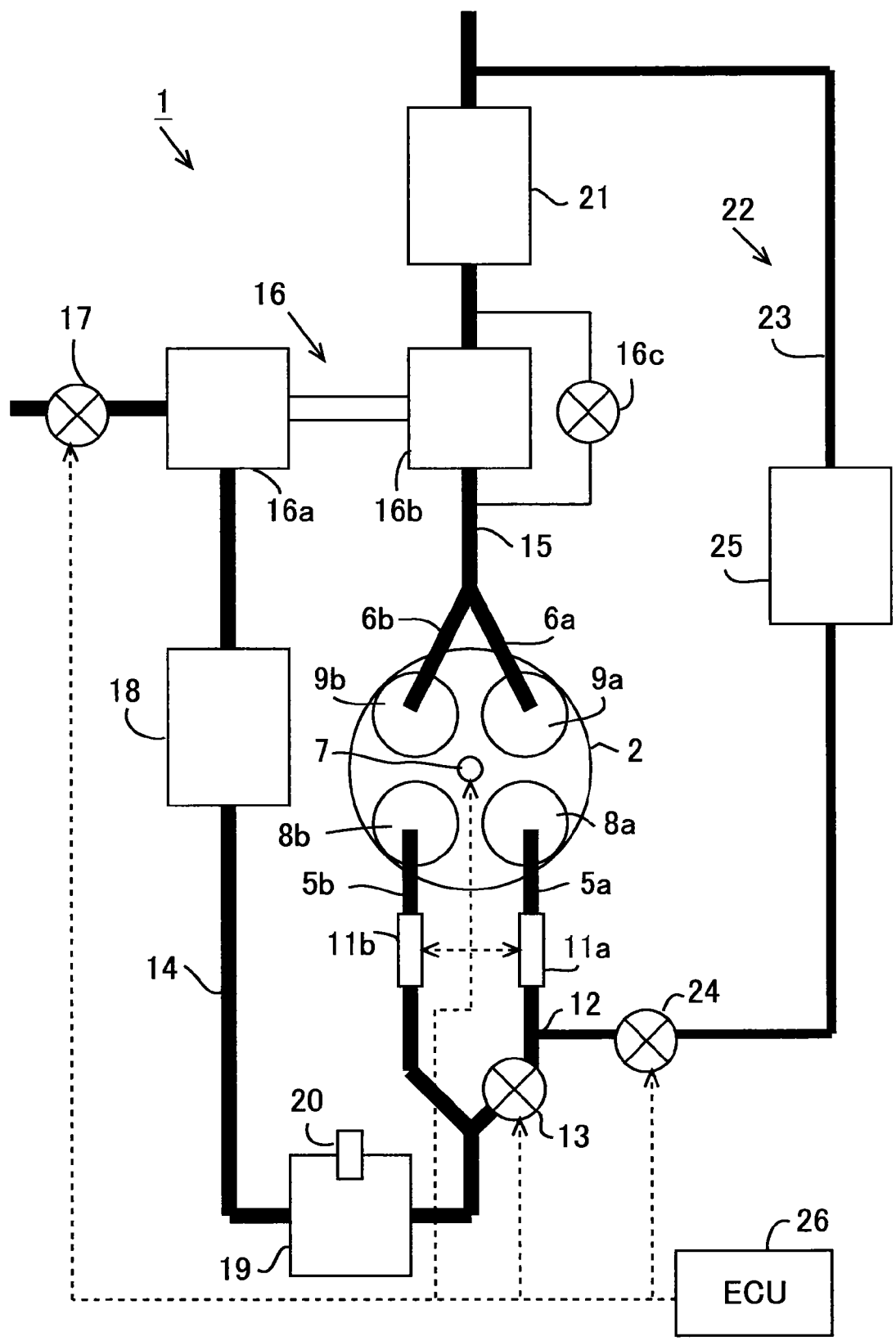
[FIG. 2] A diagram showing a schematic structure of the internal combustion engine according to the Embodiment 1 and its intake system and exhaust system.

FIG. 1 is a diagram showing a schematic structure of an internal combustion engine according to an Embodiment 1 of the present invention. FIG. 2 is a diagram showing a schematic structure of the internal combustion engine according to the Embodiment 1 and its intake system and exhaust system. An internal combustion engine 1 shown in FIG. 1 and FIG. 2 is a spark ignition type four stroke cycle gasoline engine for driving a vehicle and having four cylinders 2.

In each cylinder 2 of the internal combustion engine 1, a piston 3 is slidably disposed. At the upper portion in the cylinder 2, a combustion chamber 4 is formed in a compartment by the upper wall and the inner circumference wall of the cylinder 2 and the top surface of the piston 3. At the upper portion of the combustion chamber 4, connected thereto are a first intake port 5a and a second intake port 5b, and a first exhaust port 6a and a second exhaust port 6b. The first intake port 5a and the second intake port 5b are independently and respectively connected to the combustion chamber 4 to supply an intake air to the combustion chamber 4. The first exhaust port 6a and the second exhaust 6b discharge an exhaust gas after performing combustion in the combustion chamber 4. A spark plug 7 is arranged at the center of the upper portion of the cylinder 2 for performing ignition of the air-fuel mixture in the combustion chamber 4.

An opening into the combustion chamber 4 of the first intake port 5a in the upper wall of the cylinder 2 is opened and closed by a first intake valve 8a. An opening into the combustion chamber 4 of the second intake port 5b in the upper wall of the cylinder 2 is opened and closed by a second intake valve 8b. Further, an opening into the combustion chamber 4 of the first exhaust port 6a is opened and closed by a first exhaust valve 9a. An opening into the combustion chamber 4 of the second exhaust port 6b in the upper wall of the cylinder 2 is opened and closed by a second exhaust valve 9b.

The first intake valve 8a and the second intake valve 8b each is provided with a variable valve mechanism 10 which varies an opening and closing property of each intake valve. This variable valve mechanism 10 continuously varies a period of time of valve opening (lift quantity), which is the opening and closing property of each intake valve, and, at the same time, varies continuously a opening and closing timing (valve timing) which is the opening and closing property of each intake valve. The valve timings of the first intake valve 8a and the second intake valve 8b may be differentiated from one another by the variable valve mechanism 10. The variable valve mechanism 10 of the present Embodiment corresponds to the opening and closing property changing unit of the present invention.

The first intake port 5a and the second intake port 5b respectively include a first and a second fuel injection valves 11a and 11b which inject a fuel toward the intake air flowing through each intake port. The first intake port 5a, which is located at the upstream of the first fuel injection valve 11a, is provided with an EGR gas supply port 12. The first intake port 5a, which is located at the upstream of the EGR gas supply port 12, is provided with a fresh air blocking valve 13. The fresh air blocking valve 13, when closed, blocks inflow of the fresh air into the first intake port 5a from the upstream. The fresh air blocking valve 13 of the present Embodiment corresponds to the fresh air blocking unit of the present invention. The upstream of the first intake port 5a which is upstream of the fresh air blocking valve 13, and of the second intake port 5b which is upstream of the second fuel injection valve 11b, constitutes one intake pipe 14. The first intake port 5a of the present Embodiment corresponds to the first intake passage of the present invention. The second intake port 5b of the present Embodiment corresponds to the second intake passage of the present invention.

Further, the downstream of the first exhaust port 6a and of the second exhaust port 6b constitutes one exhaust pipe 15.

At the midway of the intake pipe 14, there is provided a compressor 16a of a turbocharger 16. At the midway of the exhaust pipe 15, there is provided a turbine 16b of the turbocharger 16. The turbocharger 16 is a supercharger that supercharges the fresh air, in which the turbine 16b is rotated by utilizing the energy of the exhaust gas flowing through the exhaust pipe 15, and the compressor 16a is driven with the rotating force of the turbine 16b. The turbine 16b is provided with a waste gate valve 16c which adjust an inflow quantity of the exhaust gas flowing into the turbine 16b.

The intake pipe 14 at the upstream of the compressor 16a is provided with a throttle valve 17. By this throttle valve 17, a quantity of the fresh air flowing through the intake pipe 14 is adjusted. The throttle valve 17 is controlled to open and close by an electric actuator.

The intake pipe 14 at the downstream of the compressor 16a is provided with an inter-cooler 18. The inter-cooler 18 cools the fresh air flowing through the intake pipe 14 by performing a heat exchange with the outside air. The intake pipe 14 at the downstream of the inter-cooler 18 is provided with a surge tank 19. The surge tank 19 temporarily stores therein the fresh air flowing through the intake pipe 14. The surge tank 19 is provided with a pressure sensor 20 which detects a pressure of the fresh air in the surge tank 19. The intake pipe 14 at the downstream of the surge tank 19 is branched into the first intake port 5a and the second intake port 5b.

The exhaust pipe 15 at the downstream of the turbine 16b is provided with an oxidation catalyst 21 which serves as a start catalyst.

The internal combustion engine 1 is provided with an EGR apparatus 22. The EGR apparatus 22 comprises an EGR passage 23, an EGR valve 24 and en EGR cooler 25.

One end of the EGR passage 23 is connected with the exhaust pipe 15 at the downstream of the oxidation catalyst 21, and the other end is connected with the EGR gas supply port 12 of the first intake port 5a. The EGR apparatus 22, by causing the EGR gas to flow through the EGR passage 23, circulates the EGR gas, which is a part of the exhaust gas, into the EGR gas supply port 12 provided in the first intake port 5a, from the exhaust pipe 15 of the internal combustion engine 1.

The EGR valve 24 and the EGR cooler 25 are provided in the EGR passage 23. A quantity of the EGR gas, which is introduced into the first intake port 5a from the exhaust pipe 15 after passing through the EGR passage 23, is adjusted by the EGR valve 24. The EGR cooler 25 cools the EGR gas flowing through the EGR passage 23 by performing the heat exchange with a cooling water of the engine.

The internal combustion engine 1 structured as described above is provided with an electronic control unit (hereinafter will be called "the ECU") 26 as an annex. A crank position sensor 27 and an accelerator opening degree sensor 28 are electrically connected to the ECU 26. Output signals from these sensors are inputted into the ECU 26. The crank position sensor 27 is a sensor which detects a crank angle of the internal combustion engine 1. Further, the accelerator opening degree sensor 28 is a sensor which detects the accelerator opening degree of a vehicle mounted with the internal combustion engine 1.

Still further, the ECU 26 is electrically connected with the variable valve mechanism 10, the first and the second fuel injection valves 11a and 11b, the fresh air blocking valve 13, the throttle valve 17 and the EGR valve 24. These are controlled by the ECU 26.

(Control of Stratified Combustion of EGR Gas with Air-Fuel Mixture)

It should be noted that with the internal combustion engine 1 according to the present embodiment, when the combustion is carried out by introducing the EGR gas into the combustion chamber 4, the stratified combustion is performed in the combustion chamber 4 by the stratification of the EGR gas and the air-fuel mixture, in order to increase the quantity of EGR gas to be supplied to the combustion chamber 4. By performing the stratified combustion, decrease of NOx in the exhaust gas and improvement of the fuel consumption can be achieved.

When the stratified combustion is carried out by introducing the EGR gas, the fresh air is supercharged by the compressor 16a of the turbocharger 16, the fresh air blocking valve 13 is closed to block inflow of the fresh air into the first intake port 5a, the first intake valve 8a is opened by the variable valve mechanism 10 before opening of the second take valve 8b, and, thereafter, the second intake valve 8b is opened.

Figure 3:
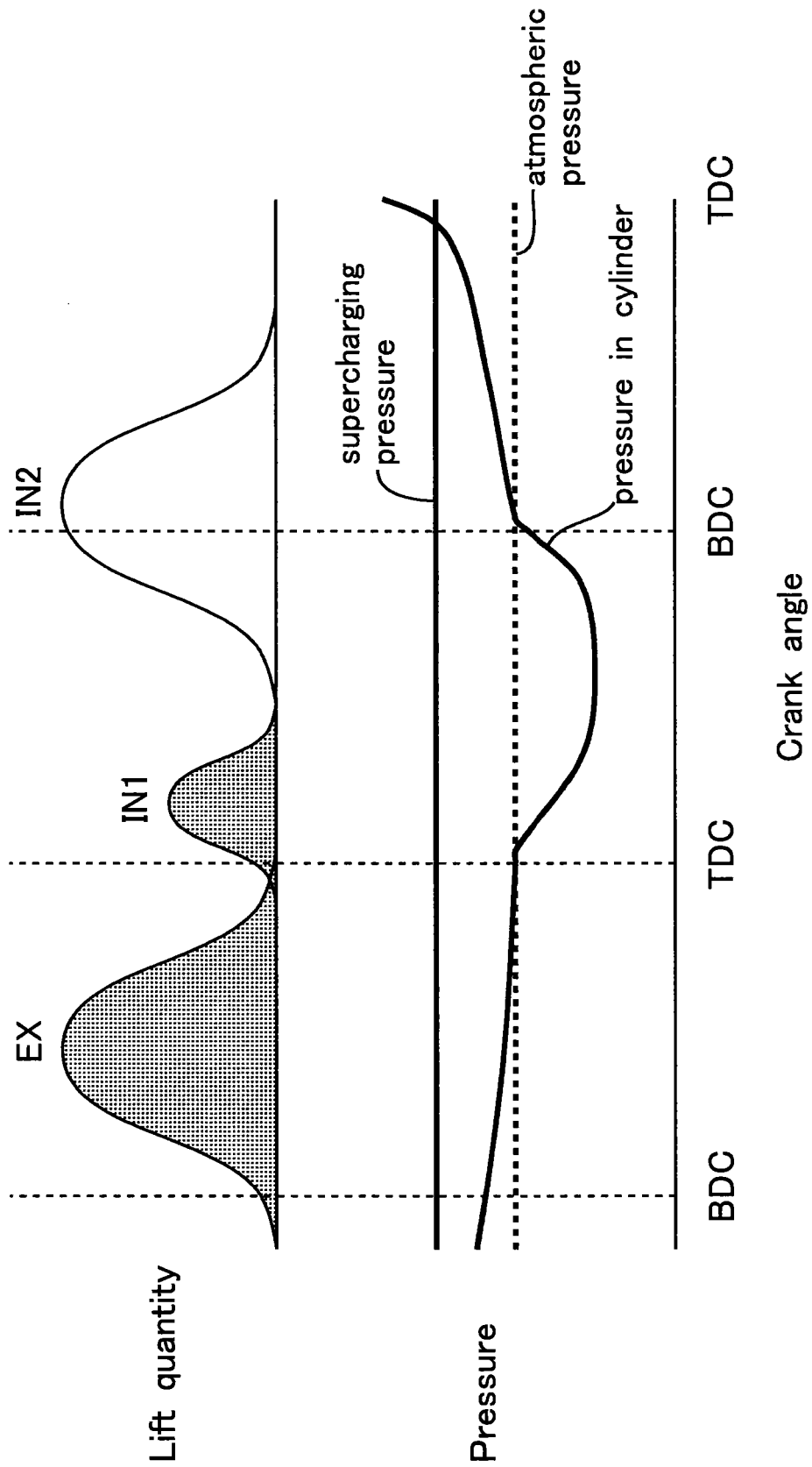
[FIG. 3] A diagram showing an example of valve timing of an intake valve and an exhaust valve during the stratified combustion and an internal pressure of a cylinder and a supercharger pressure at that time according to the Embodiment 1.

Specifically, when the stratified combustion is carried out, the fresh air is supercharged by the compressor 16a, the fresh air blocking valve 13 is closed to block inflow of the fresh air into the first intake port 5a, and, at the same time, the EGR valve 24 is opened to have the EGR gas flow into the first intake port 5a. As shown in FIG. 3, the first intake valve 8a is opened by the variable valve mechanism 10 immediately before the intake stroke, and the second intake valve 8b is opened about the time when the first intake valve 8a is closed. FIG. 3 is a diagram showing an example of valve timing of the intake valves and the exhaust valves at the time of stratified combustion, and a pressure in the cylinder and a supercharging pressure at that time. The lift quantity of the first intake valve 8a is about a half of the lift quantity of the second intake valve 8b, because the EGR gas is so supplied to be combustible in the combustion chamber 4.

Further, the first fuel injection valve 11a provided in the first intake port 5a is allowed to pause, and the fuel is injected only from the second fuel injection valve 11b provided in the second intake port 5b. Due to this, the air-fuel mixture, which comprises a mixture of the fresh air and the fuel, is to flow into the second intake port 5b.

The ECU 26, which performs such control, corresponds to the control unit of the present invention.

Figure 4:
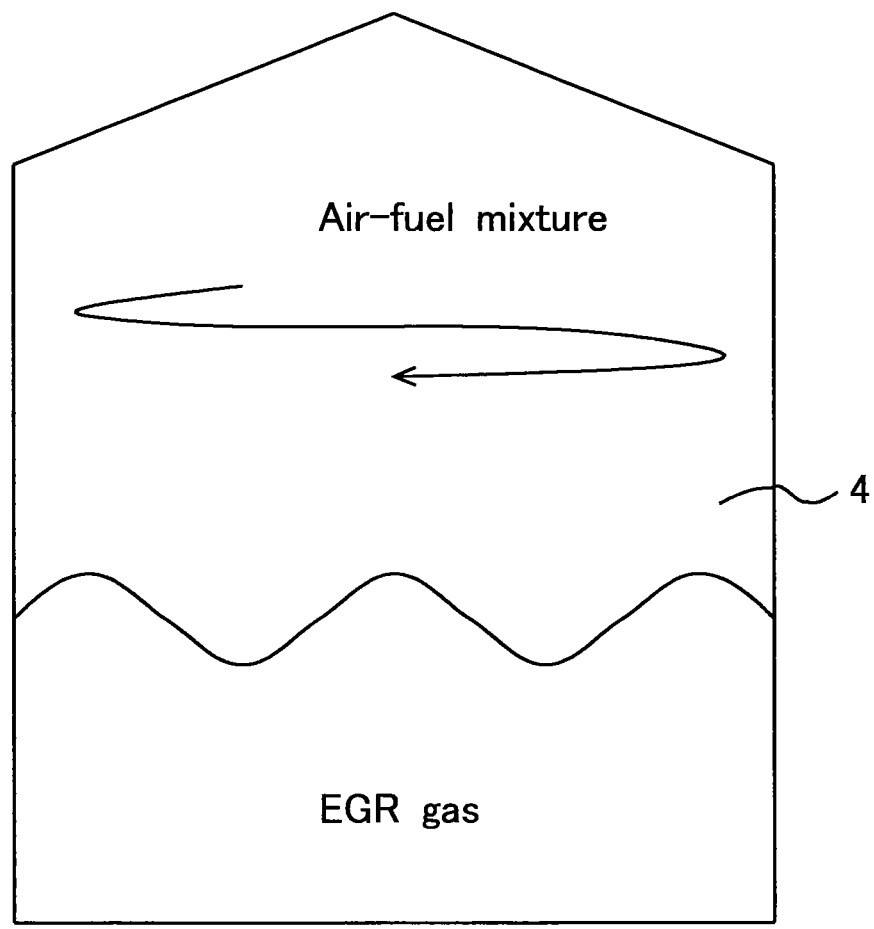
[FIG. 4] A diagram showing a stratified state in the combustion chamber according to the Embodiment 1.

In this way, the fresh air blocking valve 13 is closed to block the fresh air to flow into the first intake port 5a and the EGR gas is flowed into the first intake port 5a, then the first intake valve 8a is opened by the variable valve mechanism 10 before opening of the second intake valve 8b, thereby the EGR gas which flows through the first intake port 5a first flows into the combustion chamber 4. This EGR gas, by flowing-in from the first intake port 5a located at one side of the combustion chamber 4, descends with the descending of the piston 3, while forming the swirl flow, in the combustion chamber 4. Since the second intake valve 8b is opened by the variable valve mechanism 10, the air-fuel mixture flowing through the second intake port 5b flows into the combustion chamber 4. This air-fuel mixture, by flowing-in from the second intake port 5b located at the other side of the combustion chamber 4, constitutes in the combustion chamber 4 a layer in which the swirl flow is formed above the EGR gas which flowed therein first. Thus, in the combustion chamber 4, as shown in FIG. 4, the stratification can be achieved which comprises the EGR gas layer as the lower layer and the air-fuel mixture layer as the upper layer. FIG. 4 is a diagram showing, in the combustion chamber 4, the stratified state in which the EGR gas layer is the lower layer and the air-fuel mixture layer is the upper layer.

Here, as shown in FIG. 3, the valve opening period of time of the second intake valve 8b may be included in the compression stroke. With the ordinary internal combustion engine, during the compression stroke, the piston ascends so that the volume of the combustion chamber becomes smaller and the inner pressure of the cylinder is increased, thereby if the intake valves are opened there will be a possibility that the gas in the combustion chamber would be caused to flow backward. However, with the present embodiment, the fresh air is supercharged, and the supercharging pressure of the fresh air to be supercharged by the compressor 16a, is made higher than the inner pressure of the cylinder of the internal combustion engine 1 during the period of time from closing of the first intake valve 8a to the closing of the second intake valve 8b. Whereby the supercharged air-fuel mixture flows into the combustion chamber 4, without being caused to flow backward by forcibly pushed by the inner pressure of the cylinder of the internal combustion engine 1. Further, the gas in the combustion chamber 4 is not caused to flow backward toward the second intake port 5b.

When the engine load is high as the operation state of the internal combustion engine 1 such as the one shown in FIG. 3, consequently, it becomes difficult for the air-fuel mixture, which flows in the combustion chamber 4 after the EGR gas, to flow into the combustion chamber 4 with the negative pressure by the descending of the piston 3 during the intake stroke. However, with the present embodiment, the fresh air is supercharged by the compressor 16a, thereby the air-fuel mixture can flow into the combustion chamber 4 by being supercharged, not only during the intake stroke, but also during the compression stroke. Hence, even the engine load is high, the stratification of the EGR gas and the air-fuel mixture can be achieved without deteriorating the intake efficiency, and, at the same time, the EGR gas can be introduced in a large quantity. Thus, in the case of WOT (full load) as the case where the engine load is high, the EGR gas can be introduced.

Further, the air-fuel mixture which flows into the combustion chamber 4 from the second intake port 5b forms the swirl flow in the later half of the intake stroke or during the compression stroke. Because of this, a period of time from forming the swirl flow by the air-fuel mixture in the combustion chamber 4 to ignition is short, thereby the stratified state of the combustion chamber 4 is easy to be maintained until ignition. Hence, during the compression stroke, it is difficult for causing a tumble flow in the combustion chamber 4, so that the stratified state is difficult to be destroyed by the tumble flow, resulting in exhibiting the effect of the stratification to the maximum.

Moreover, with the present embodiment, the EGR passage 23 connects the exhaust pipe 15 at the downstream from the turbine 16b of the turbocharger 16 with the EGR gas supply port 12. The EGR gas which is the part of the exhaust gas of the exhaust pipe 15 at the downstream of the turbine 16b of the turbocharger 16, has its temperature and pressure dropped, as it is after the EGR gas performed the driving of the turbine 16b. With the present embodiment, this EGR gas is flowed into the combustion chamber 4 by the negative pressure caused by the descending of the piston 3 in the intake stroke from the beginning of the intake stroke. At this time, the negative pressure is secured sufficiently so that even this EGR gas having the temperature and the pressure being dropped is enough to be appropriately supplied to the combustion chamber 4. By the use of this EGR gas, rising of the intake temperature is suppressed, thereby reducing of the charging efficiency caused by a high intake temperature can be suppressed.

Figure 5:
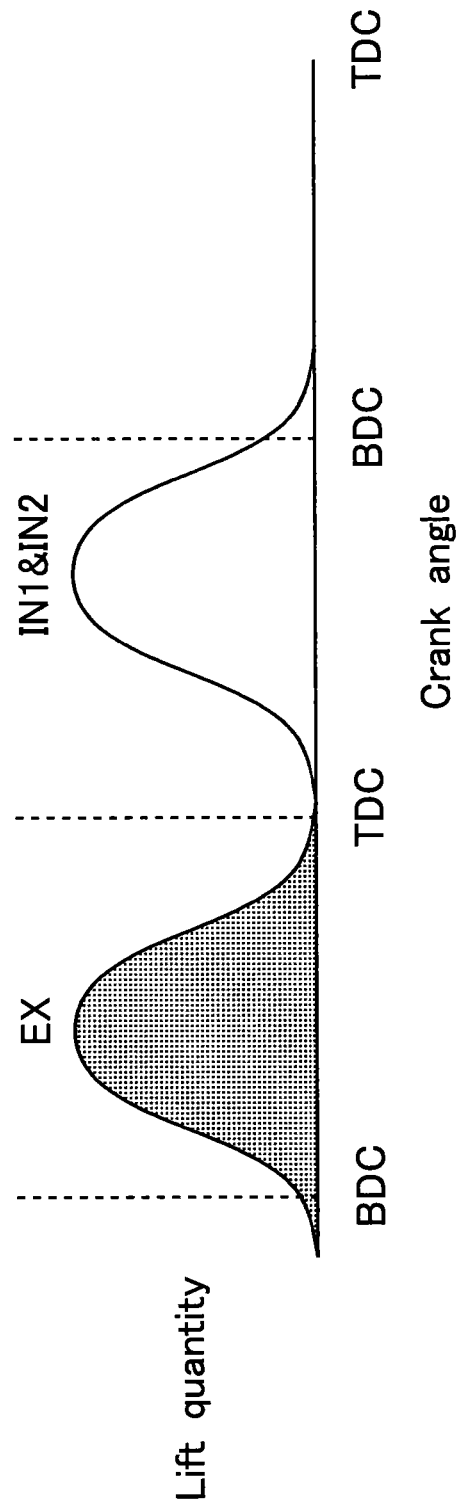
[FIG. 5] A diagram showing an example of valve timing of the intake valve and the exhaust valve during non-stratified combustion according to the Embodiment 1.

It should be noted that in the case where the operation state of the internal combustion engine 1 is such that the stratified combustion is not performed and the requesting torque is high and the engine load is high, the non-stratified combustion is performed. In performing this non-stratified combustion, the EGR valve 24 is closed to stop supplying of the EGR gas, the fresh air blocking valve 13 is opened, the fuel is injected from the two fuel injection valves, that is, the first and the second fuel injection valves 11a and 11b, and, as shown in FIG. 5, the first intake valve 8a and the second intake valve 8b are set to the same lift quantity and the same timing by the variable valve mechanism 10. FIG. 5 is a diagram showing an example of the valve timing of the intake valve and the exhaust valve at the time of non-stratified combustion.

(Combustion Control Routine)

Figure 6:
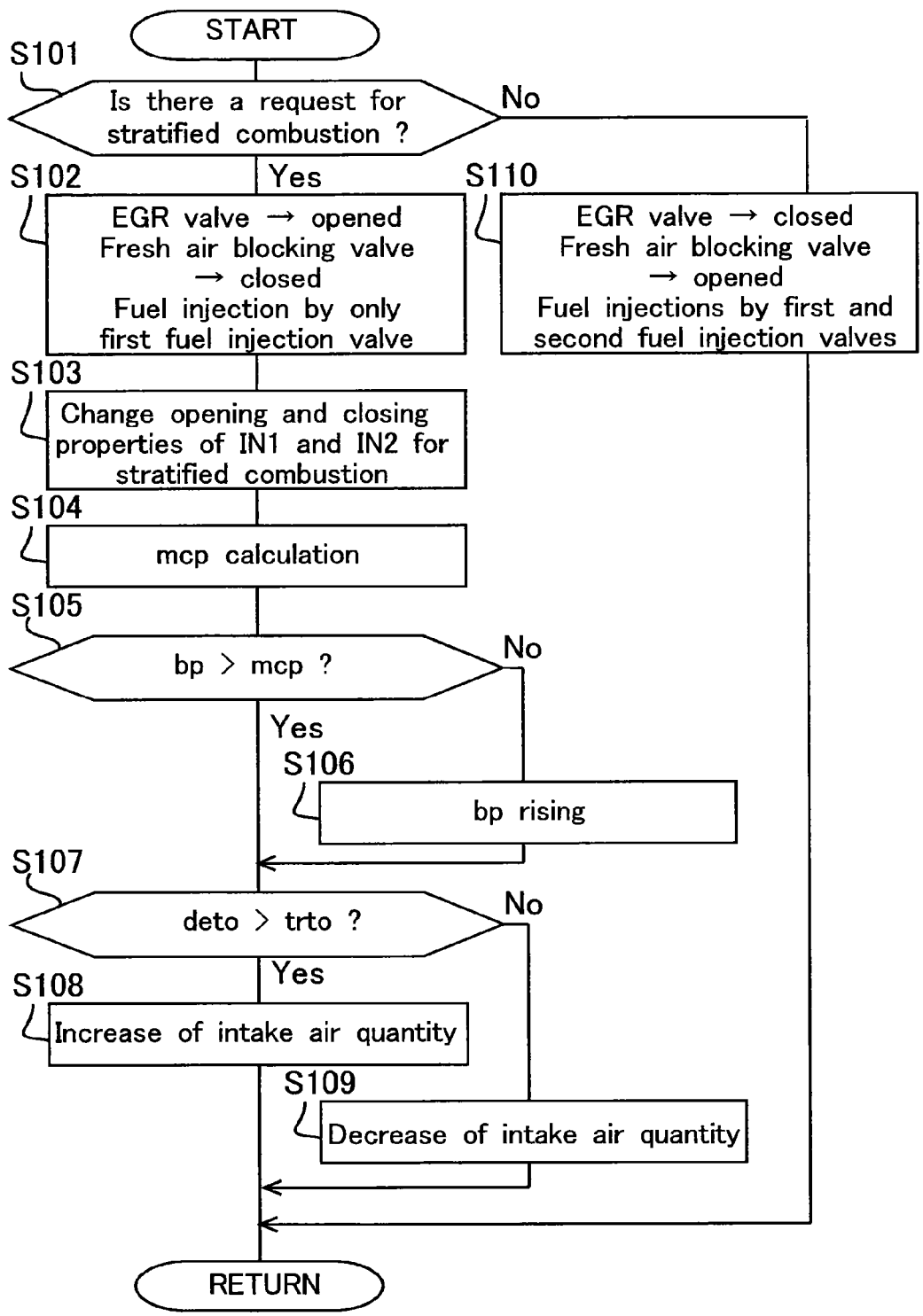
[FIG. 6] A flowchart showing a combustion control routine of the internal combustion engine according to the Embodiment 1.

A description will be made of a combustion control routine of the internal combustion engine 1 based on the flow chart shown in FIG. 6. FIG. 6 is a flow chart showing the combustion control routine of the internal combustion engine 1. This routine is executed by the ECU 26 repeatedly at every predetermined time.

Upon starting of the routine shown in FIG. 6, it is determined in S101 as to whether or not there is a request for performing the stratified combustion of the EGR gas and the air-fuel mixture. As the operation state of the internal combustion engine 1, in which the stratified combustion should be performed, is in the region where, for example, the engine load is in the order of a medium load thereby desirable to achieve saving of the fuel consumption. The region, where the stratified combustion should be performed, is mapped in advance, and the engine revolution speed and the engine load, which can be obtained from outputs of the crank position sensor 27 and the accelerator opening degree sensor 28, are incorporated in the map, thereby the determination of whether or not there is the request for performing the stratified combustion. When, in S101, it is determined affirmative that there is the request for performing the stratified combustion, the routine shifts to S102. When, in S101, it is determined negative that there is no request for performing the stratified combustion, the routine shifts to S110.

In S102, the EGR valve 24 is opened, the fresh air blocking valve 13 is closed and the fuel is injected from only the second fuel injection valve 11b provided in the second intake port 5b. The first fuel injection valve 11a provided in the first intake port 5a is in a pause.

In S103, the lift quantity and the opening and closing property of the valve timing of the first intake valve 8a and the second intake valve 8b are changed by the variable valve mechanism 10 for the stratified combustion. Specifically, the opening timing of the second intake valve 8b is lagged until about the first intake valve 8a is closed, so as to have the first intake valve 8a opened before opening of the second intake valve 8b, and, thereafter, the second intake valve 8b is opened. At this time, the lift quantity of the first intake valve 8a is also changed to about half of the lift quantity of the second intake valve 8b.

In S104, the maximum cylinder pressure mcp of the internal combustion engine 1 during a period from closing of the first intake valve 8a to closing of the second intake valve 8b at the time of stratified combustion, is calculated. This maximum cylinder pressure mcp is calculated based on the quantity of the EGR gas obtained from the opening degree of the EGR valve 24, the valve timing and the lift quantity of the first intake valve 8a and the second intake valve 8b, the engine revolution speed and the crank angle.

In S105, it is determined whether or not the supercharge pressure bp detected by the pressure sensor 20 of the surge tank 19 is larger than the maximum cylinder pressure mcp calculated in S104. When, in S105, it is determined affirmative that the supercharge pressure bp is larger than the maximum cylinder mcp calculated in S104, the routine shifts to S107. On the other hand, when, in S105, it is determined negative that the supercharge pressure bp is not larger than the maximum cylinder pressure mcp, the routine shifts to S106.

In S106, the fresh air is supercharged by the compressor 16a, thereby to increase the supercharge pressure bp.

In S107, it is determined whether or not the requesting torque deto is larger than the actual torque trto. The requesting torque deto can be obtained from the output of the accelerator opening degree sensor 28. The actual torque trto can be obtained from the fuel injection quantity of the second fuel injection valve 11b provided in the second intake port 5b. When, in S107, it is determined affirmative that the requesting torque deto is larger than the actual torque trto, the routine shifts to S108. On the other hand, when, in S107, it is determined negative that the requesting torque deto is not larger than the actual torque trto, the routine shifts to S109.

In S108, the intake quantity is increased. The increase of the intake quantity is made in such manner that, for example, the opening degree of the throttle valve 17 may be made larger, the valve timing of the first intake valve 8a and the second intake valve 8b may be advanced, the lift quantity of the first intake valve 8a and the second intake valve 8b may be made larger, and the supercharge pressure bp may be raised. After this step, this routine is finished for the time being.

In S109, the intake quantity is decreased. The decrease of the intake quantity is made in such manner that, for example, the opening degree of the throttle valve 17 may be made smaller, the valve timing of the first intake valve 8a and the second intake valve 8b may be lagged, and the lift quantity of the first intake valve 8a and the second intake valve 8b may be made smaller. After this step, this routine is finished for the time being.

On the other hand, in S110, in order to perform the non-stratified combustion, the EGR valve 24 is closed, the fresh air blocking valve 13 is opened, and the fuel injections are made by the first and the second fuel injection valves 11a and 11b respectively provided in the first intake port 5a and the second intake port 5b. After this step, this routine is finished for the time being.

With the present routine as described above, the stratified combustion and the non-stratified combustion can be switched between them.

(Others)

Figure 7:
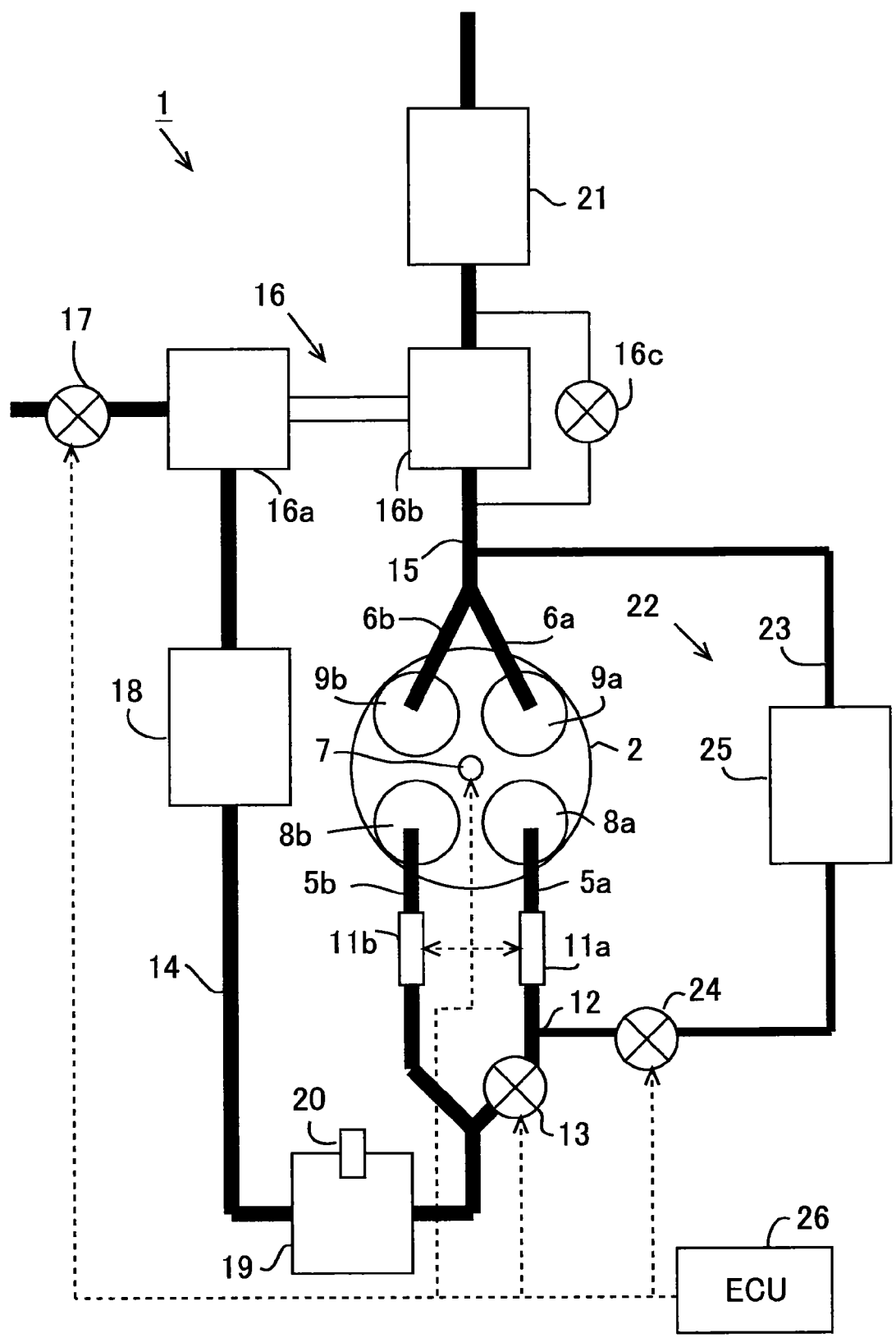
[FIG. 7] A diagram showing a schematic structure of an internal combustion engine according to another example of the Embodiment 1 and its intake system and exhaust system.

It should be noted that with the present embodiment, the EGR passage 23 connects the exhaust pipe 15 at the downstream from the turbine 16b of the turbocharger 16 with the EGR gas supply port 12. Thus, by using the EGR gas in which the temperature and the pressure are dropped, increase of the intake temperature is suppressed and the decrease of the charging efficiency caused by the high intake temperature is suppressed. However, the present invention is not limited to this. FIG. 7 is a diagram showing a schematic structure of an internal combustion engine according to another example of the embodiment 1 and its intake system and exhaust system. The EGR passage 23 may, as shown in FIG. 7, connects the exhaust pipe 15 at the upstream from the turbine 16b of the turbocharger 16 with the EGR gas supply port 12. In this way, a part of the exhaust gas discharged from the internal combustion engine 1 and having a high back pressure may be used as the EGR gas, thereby the EGR gas can be sent into the internal combustion engine 1 in a large quantity and at a high pressure.

Figure 8:
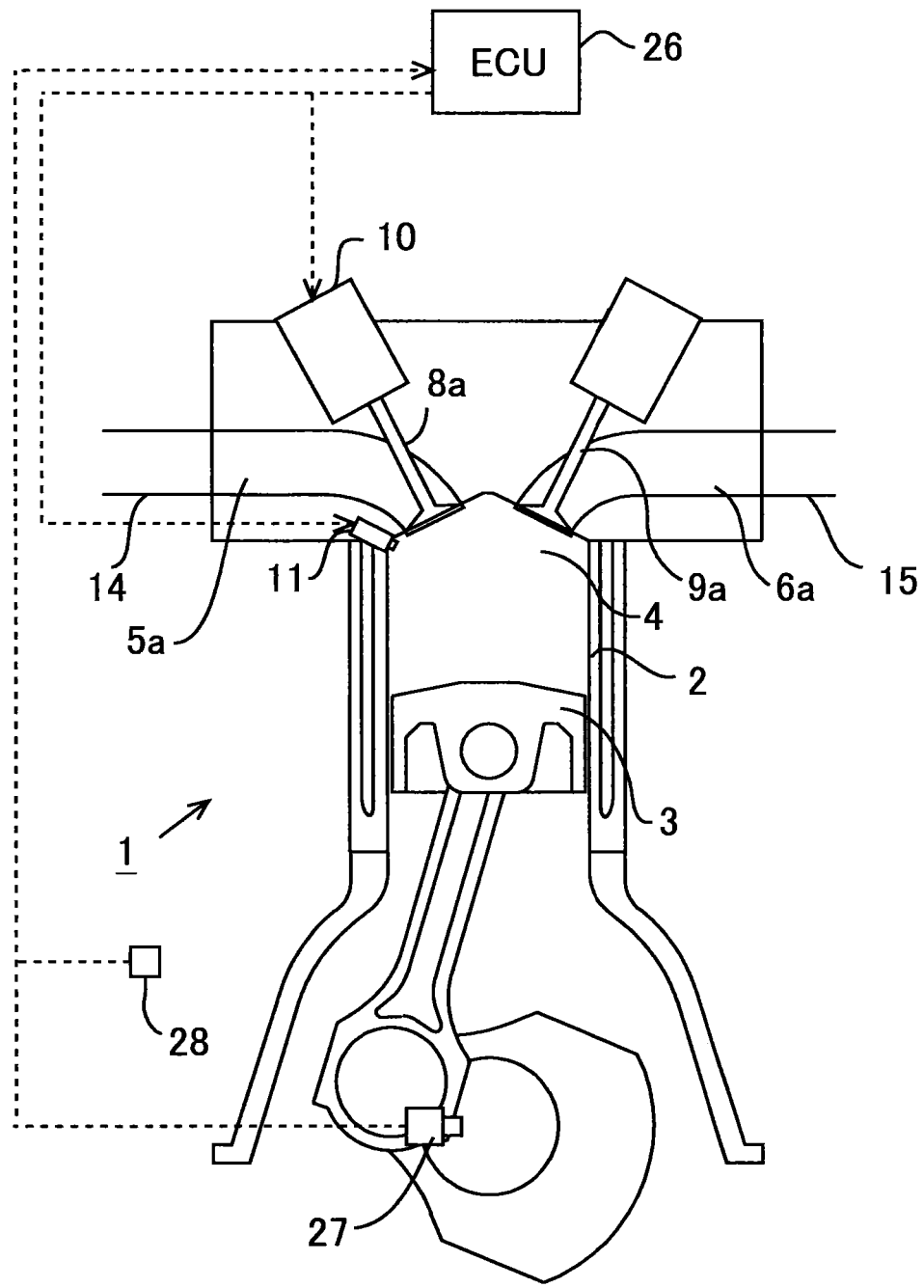
[FIG. 8] A diagram showing a schematic structure of an internal combustion engine according to another example of the Embodiment 1.

Further, with the present embodiment, the fuel injection valves are provided in the first intake port and the second intake port. However, the embodiment is not limited to this. FIG. 8 is a diagram showing a schematic structure of an internal combustion engine according to another example of the embodiment 1. The fuel injection valve 11 may be, as shown in FIG. 8, provided at an oblique upper portion of the cylinder 2, and it may perform a cylinder injection. In this case, at the time of performing the stratified combustion, the layer of the fresh air, which is the upper layer, is formed above the layer of the EGR gas, which is the lower layer. Thus, at the time of performing the stratified combustion, the fuel injection valve 11 sets an injection axis line so as to inject the fuel to only the fresh air of the fresh air layer, which is the upper layer. In this way, providing only one fuel injection valve is sufficient, thereby an increase of cost can be suppressed.

Further, with the present embodiment, a turbocharger is used as the supercharger. But the present invention is not limited to this. The present invention may use a supercharger as the supercharger.

Embodiment 2

In an embodiment 2, a first intake port and a second intake port use a helical port or a tangential port so that the intake air which flow into the combustion chamber forms the swirl flow in the same direction. All other structures are the same with that of the embodiment 1, so that the description thereof will be omitted.

Figure 9:
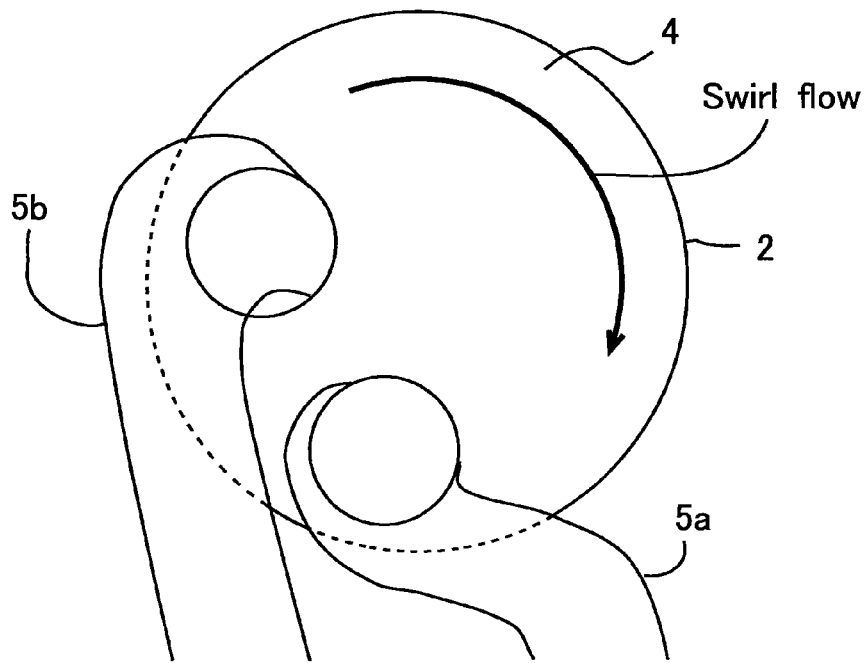
[FIG. 9] A diagram showing the state wherein a helical port or a tangential port is used for a first intake port and a second intake port according to an Embodiment 2.
Figure 9:
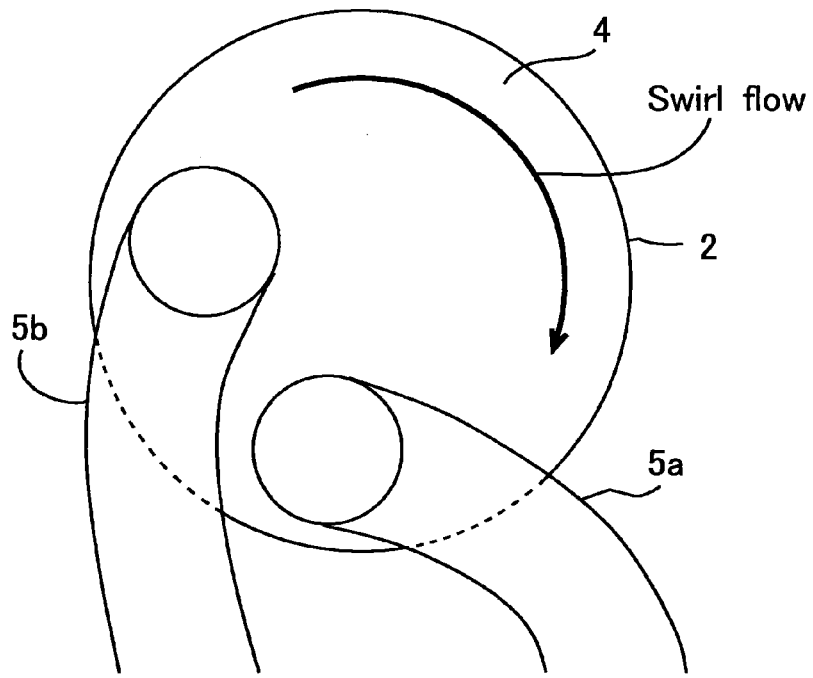

FIG. 9 is a diagram showing a state in which the helical port or the tangential port is used for the first intake port 5a and the second intake port 5b according to the present embodiment. FIG. 9(a) is a diagram showing a double helical intake port, and FIG. 9(b) is a diagram showing a double tangential intake port. As shown in FIG. 9, the first intake port 5a and the second intake port 5b are the helical port or the tangential port, thereby the intake air, which has flowed into the combustion chamber 4, forms the swirl flow in the same direction. In addition to the structure shown in FIG. 9, a combination wherein one intake port is the helical port and the other intake port is the tangential port, may be used.

Figure 10:
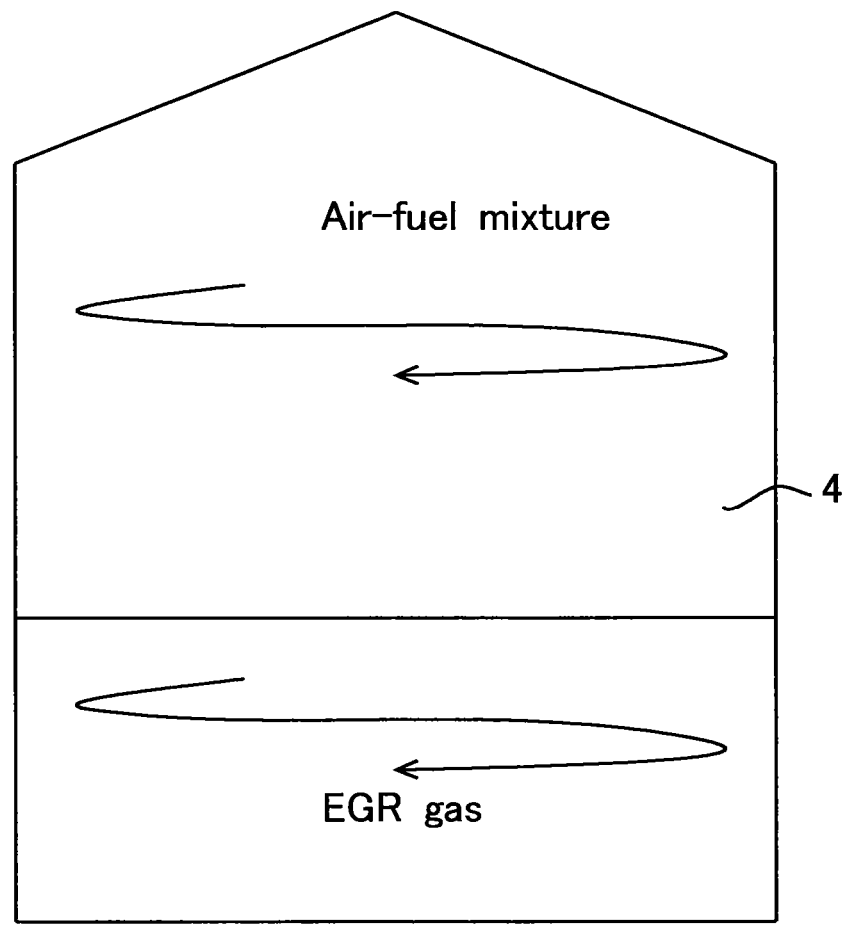
[FIG. 10] A diagram showing a stratified state in a combustion chamber according to the Embodiment 2.

In this way, when the stratified combustion is performed, the lower layer forming the swirl flow of the EGR gas which has flowed-in first and the upper layer forming the swirl flow of the air-fuel mixture above the lower layer are whirling as the swirl flows in the same direction in the combustion chamber 4, as shown in FIG. 10. FIG. 10 is a diagram showing the stratified state wherein the layer of the EGR gas is the lower layer and the layer of the air-fuel mixture is the upper layer. As a result, it is difficult to produce frictions at the boundary surface between the upper layer and the lower layer, and also it is difficult to cause mixing of the EGR gas with the air-fuel mixture, and, hence, the stratified state can be maintained for as long as possible. With this, coupled with the fact that the swirl flow of the upper layer is formed in the later half of the intake stroke and in the compression stroke, the stratified state can be maintained until the ignition time.

Embodiment 3

In an embodiment 3, at the time of performing the stratified combustion, and in the case where the air-fuel mixture flowing through the second intake port is not required to be flowed into the combustion chamber in the compression stroke, the compressor of the turbocharger is not operated and the fresh air is not supercharged. All other structures are the same with that of the embodiment 1, so that the description thereof will be omitted.

In the present embodiment, at the time of performing the stratified combustion, and in the case where the air-fuel mixture flowing through the second intake port 5b is to flow into the combustion chamber 4 in the compression stroke, the control which is the same as that of the embodiment 1 is carried out. However, at the time of performing the stratified combustion and in the case where the air-fuel mixture which flows through the second intake port 5b is not required to be flowed into the combustion chamber 4 in the compression stroke, the compressor 16a of the turbocharger 16 is not operated and the fresh air is not supercharged, wherein the fresh air blocking valve 13 is closed to block inflow of the fresh air into the first intake port 5a, the first intake valve 8a is opened before opening of the second intake valve 8b, and thereafter the second intake valve 8b is opened, by the variable valve mechanism 10.

Figure 11:
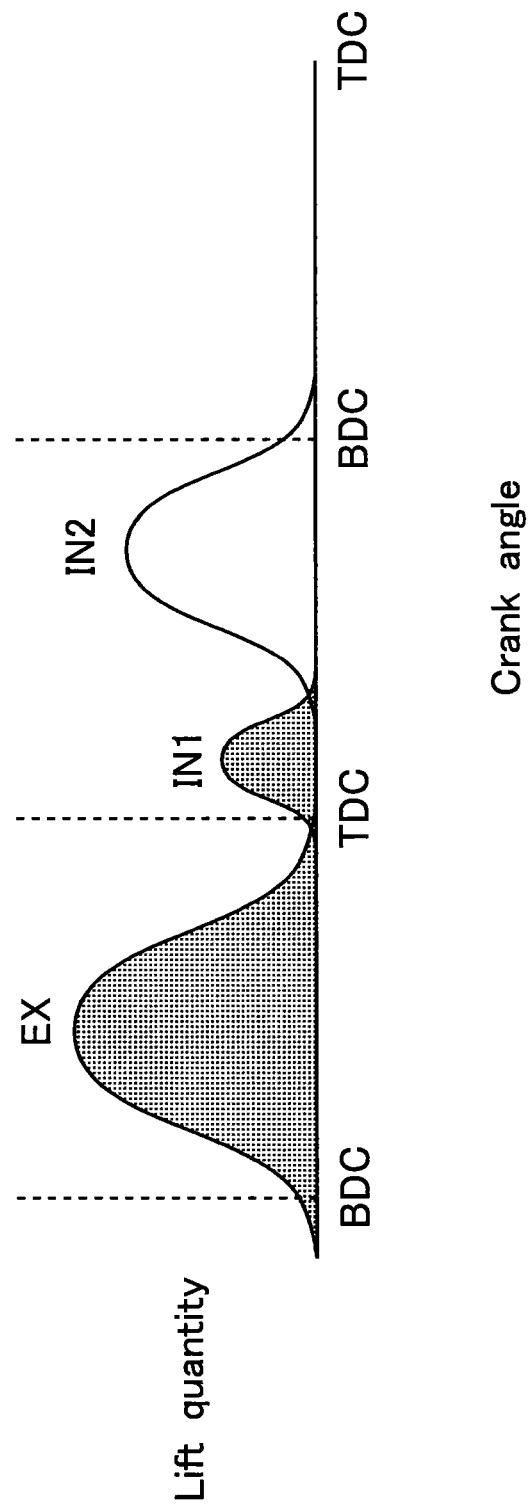
[FIG. 11] A diagram showing an example of valve timing of an intake valve and an exhaust valve at the time of stratified combustion when, in a compression stroke according to an Embodiment 3, it is not necessary to have an air-fuel mixture flowing through a second intake port flow into a combustion chamber.

Specifically, at the time of performing the stratified combustion, and in the case where the air-fuel mixture flowing through the second intake port 5b is not required to be flowed into the combustion chamber 4 in the compression stroke, the fresh air is not supercharged by the compressor 16a, the fresh air blocking valve 13 is closed to block the inflow of the fresh air into the first intake port 5a, and, at the same time, the EGR valve 24 is opened to allow the EGR gas to flow into the first intake port 5a. Then, as shown in FIG. 11, the first intake valve 8a is opened from immediately before the intake stroke by the variable valve mechanism 10, and the second intake valve 8b is opened about the time when the first intake valve 8a is closed. Then, the second intake valve 8b is closed immediately after the compression stroke. FIG. 11 is a diagram showing an example of the valve timing of the intake valve and the exhaust valve at the time of performing the stratified combustion when the air-fuel mixture flowing through the second intake port is not required to be flowed into the combustion chamber in the compression stroke. The lift quantities of the first intake valve 8a and the second intake valve 8b are both small. The lift quantity of the first intake valve 8a is about half of the lift quantity of the second intake valve 8b, because it supplies the EGR gas to be combustible in the combustion chamber 4. Further, the first fuel injection valve 11a provided in the first intake port 5a is paused, and the fuel is injected only from the second fuel injection valve 11b provided in the second intake port 5b. Because of this, the air-fuel mixture comprising the fresh air and the fuel flows through the second intake port 5b.

The ECU 26 which performs these controls is corresponding to the control unit of the present invention.

When the air-fuel mixture is not required to flow into the combustion chamber 4 in the compression stroke as in the case where the engine load is low as the operation state of the internal combustion engine 1, as shown in FIG. 11, the air-fuel mixture, which inflows after the EGR gas, can be allowed to flow into the combustion chamber 4 by the negative pressure due to the descending of the piston in the intake stroke. Whereby, when the air-fuel mixture is not required to flow into the combustion chamber 4 in the compression stroke, the fresh air is not supercharged by the compressor 16a so that the energy corresponding to the energy which might have been used by the turbocharger 16 can be reduced, resulting in saving energy. Namely, there is no need to increase the output of the internal combustion engine 1 to supercharge the fresh air by the turbocharger 16, and, hence, improving the fuel consumption.

Embodiment 4

In an embodiment 4, the fresh air blocking valve is a three way valve that switches the intake air to flow through the first intake port to be either the fresh air, which inflows from the upstream of the first intake port, or the EGR gas, which inflows from the EGR gas supply port. All other structures are the same with that of the embodiment 1, so that the description thereof will be omitted.

Figure 12:
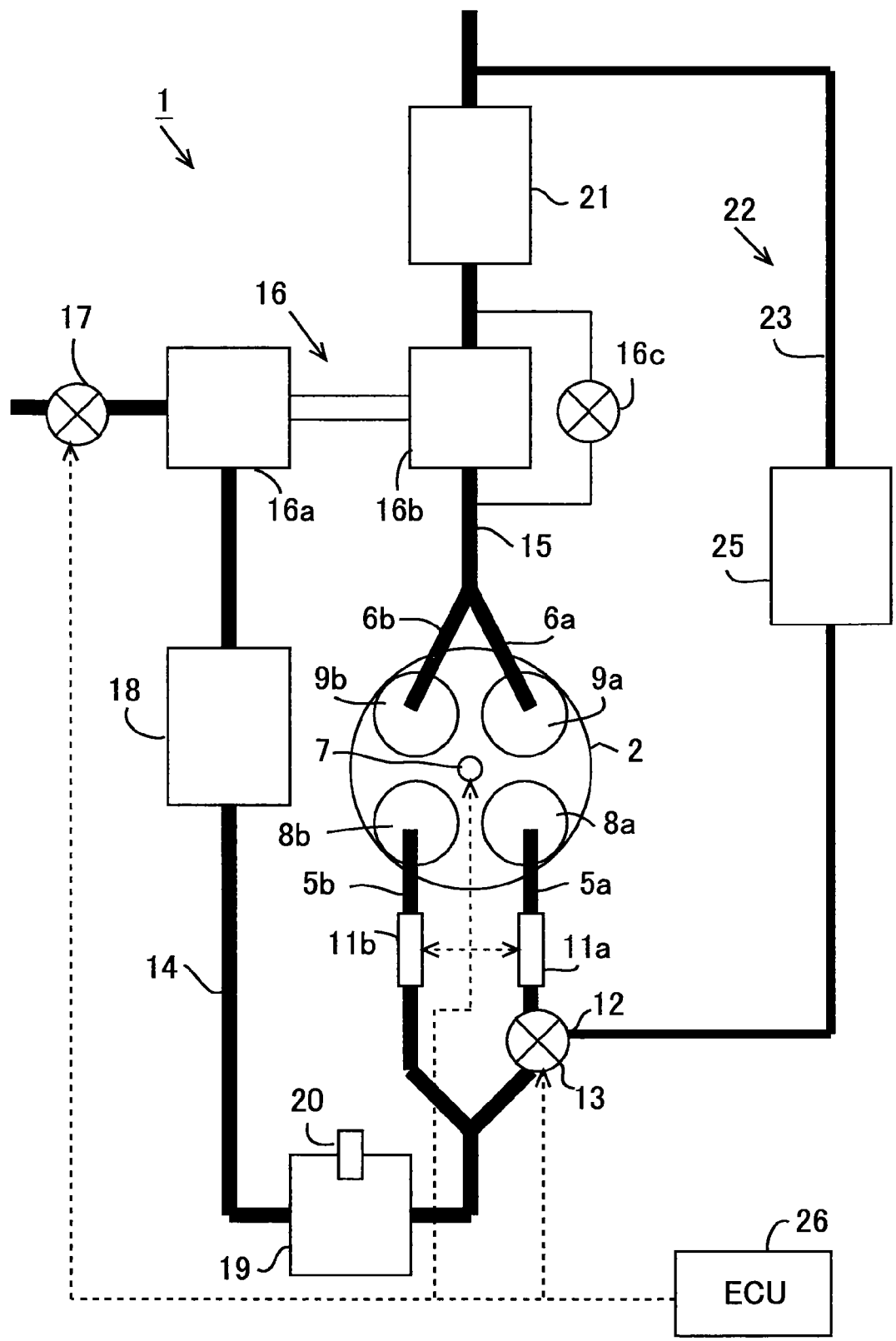
[FIG. 12] A diagram showing a schematic structure of an internal combustion engine according to an Embodiment 4 and its intake system and an exhaust system.

FIG. 12 is a diagram showing a schematic structure of an internal combustion engine according to the present embodiment and its intake system and exhaust system. As shown in FIG. 12, the EGR gas supply port 12 is located at the position of the first intake port 5a which is provided with the fresh air blocking valve 13. The fresh air blocking valve 13 switches the intake air to flow through the first intake port 5a to be either the fresh air which inflows from the upstream of the first intake port 5a, or the EGR gas which inflows from the EGR gas supply port 12. The fresh air blocking valve 13 of the present embodiment is the three way valve. Further, the EGR apparatus 22 does not have the EGR valve. The control of the quantity of the EGR gas is performed by valve opening timing and the lift quantity of the first intake valve 8a.

In this way, that is, the quantity of the EGR gas is controlled by the valve opening timing and the lift quantity of the first intake valve 8a, it is not required to provide the EGR valve to the EGR apparatus 22. Whereby, the control of the quantity of the EGR gas can be simplified, and, also, due to not requiring the EGR valve, the number of parts is reduced, resulting in effecting the cost-down.

Further, the control of the quantity of the EGR gas is performed by the first intake valve 8a, the distance between the part which controls the quantity of the EGR gas and the combustion chamber 4 becomes zero, so that there is no delay of response by the EGR gas, a misfire and torque fluctuations of the internal combustion engine 1 are suppressed, resulting in stabilizing of the drivability.

Figure 13:
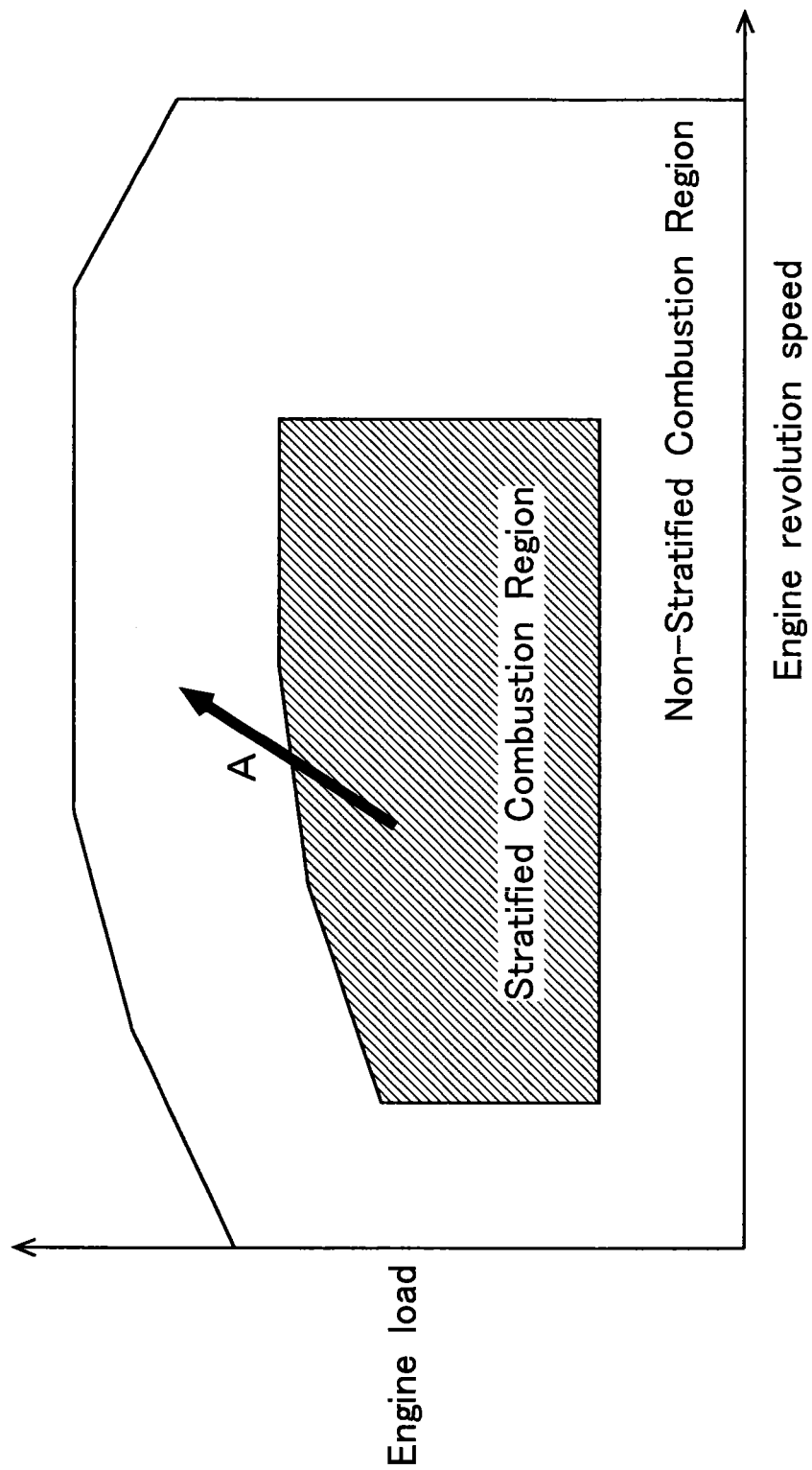
[FIG. 13] A diagram showing a pattern of selecting the stratified combustion of the EGR gas and the air-fuel mixture, and the non-stratified combustion where the EGR gas is not introduced, whichever corresponds to an operation state of the internal combustion engine according to the Embodiment 4.

FIG. 13 is a diagram showing a pattern of selecting the stratified combustion of the EGR gas and the air-fuel mixture, and the non-stratified combustion where the EGR gas is not introduced, whichever corresponds to an operation state of the internal combustion engine. With the internal combustion engine 1 of the present embodiment, the selection is made, as shown in FIG. 13, between the stratified combustion and the non-stratified combustion, according to the operation state. In FIG. 13, the horizontal axis represents the engine revolution speed of the internal combustion engine 1, and the vertical axis represents the engine load of the internal combustion engine 1.

As indicated by an arrow mark "A" in FIG. 13, when switching is made from the stratified combustion where the EGR gas is introduced in the operation state of at least either the state where the engine load is high or the state where the engine revolution speed is high, to the non-stratified combustion where the requesting torque is high and the EGR gas is not introduced, it is desirable that the switching or shifting from the stratified combustion to the non-stratified combustion without causing the delay in response; and a misfire, torque fluctuations and fluctuations in steps of torque of the internal combustion engine 1.

Thus, in the structure of the present embodiment, the volume of the first intake port 5a from the fresh air blocking valve 13 to the combustion chamber 4 is set to substantially equal to the quantity of the EGR gas supplied to the combustion chamber 4 at the time of performing the stratified combustion where the EGR gas is introduced in the operation state of at least either the state where the engine load is high or the state where the engine revolution speed is high. Hence, when the stratified combustion is performed by introducing the EGR gas in the operation state of at least either the state where the engine load is high or the state where the engine revolution speed is high, the EGR gas of the first intake port 5a from the fresh air blocking valve 13 to the combustion chamber 4 is has been used and exhausted by the combustion of one cycle.

Figure 14:
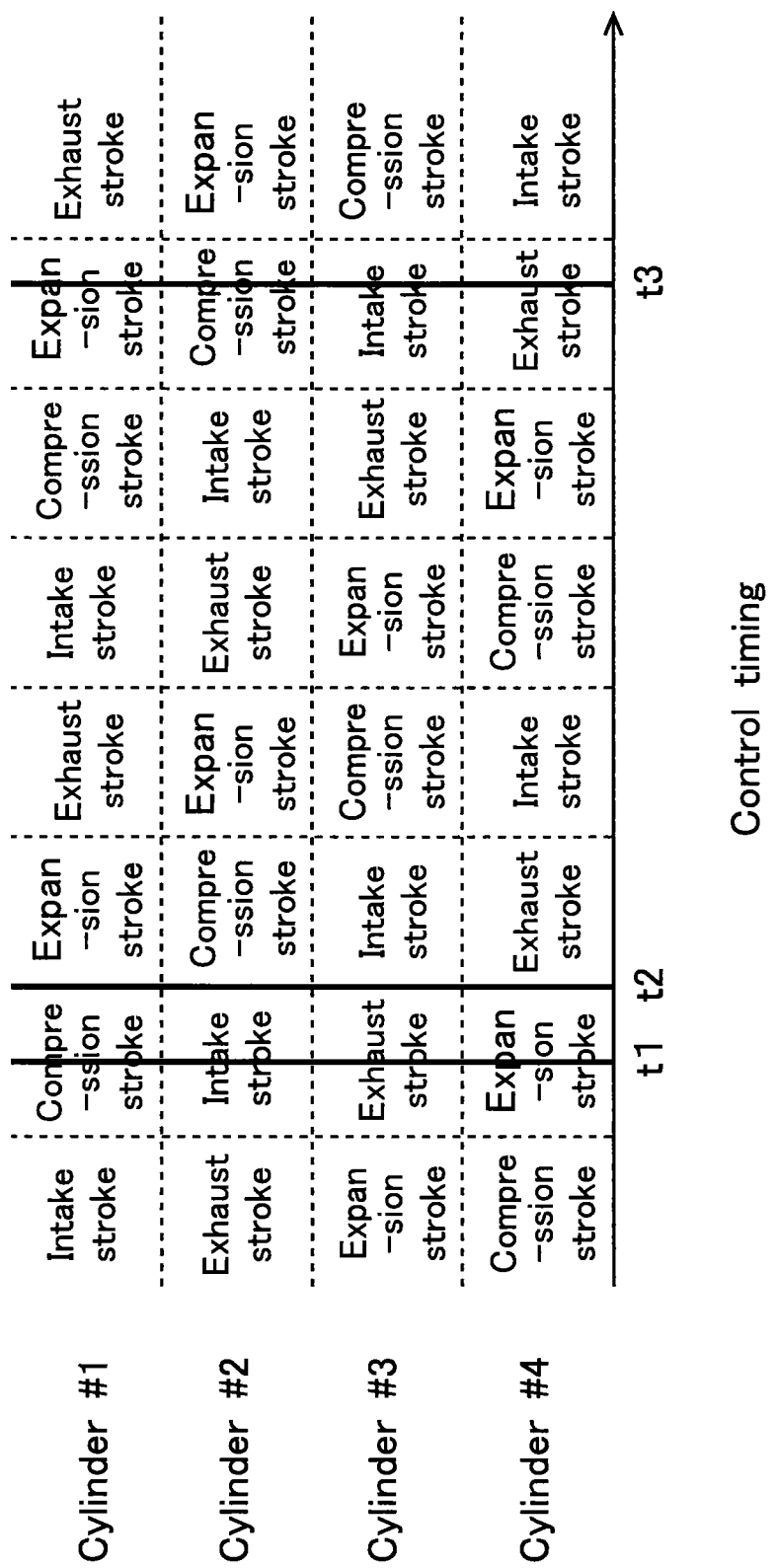
[FIG. 14] A diagram showing a control timing when switching is made from the stratified combustion to the non-stratified combustion according to the Embodiment 4.

FIG. 14 is a diagram showing a control timing when switching is made from the stratified combustion where the EGR gas is introduced in the operation state of at least either the state where the engine load is high or the state where the engine revolution speed is high, to the non-stratified combustion where the requesting torque is high and the EGR gas is not introduced. When switching is made from the stratified combustion to the non-stratified combustion as indicated by the arrow mark "A" in FIG. 13, there is, first, a request for switching (t1 in FIG. 14), and when the cylinder #3, which has entered into the intake stroke first after the request for switching, starts flowing the intake air into the combustion chamber 4 (t2 in FIG. 14), the intake air to flow through the first intake port 5a is switched, by the fresh air blocking valve 13, to the fresh air flowing-in from the upstream of the first intake port 5a. Thereafter, from the time when inflow of the intake air into the combustion chamber 4 in the first one cycle of cylinders (#1, #2 and #4), other than the cylinder #3, which had entered into the intake stroke first, has been completed (t3 in FIG. 14), the opening and closing properties of the first intake valve 8a and the second intake valve 8b are changed by the variable valve mechanism 10, as shown in FIG. 15.

The ECU 26 that performs such controls corresponds to the control unit of the present invention.

Figure 15:
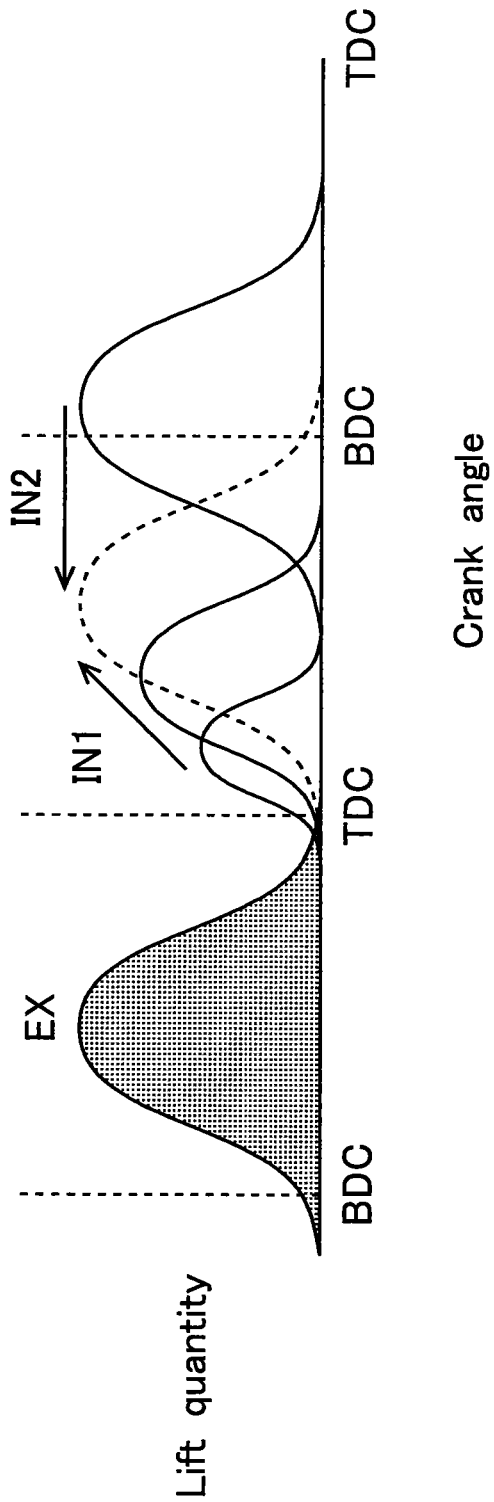
[FIG. 15] A diagram showing an example of valve timing of the intake valve and the exhaust valve when switching is made from the stratified combustion to the non-stratified combustion according to the Embodiment 4.

FIG. 15 is diagram showing an example of valve timing of the intake valve and the exhaust valve when switching is made from the stratified combustion where the EGR gas is introduced in the operation state of at least either the state where the engine load is high or the state where the engine revolution speed is high, to the non-stratified combustion where the requesting torque is high and the EGR gas is not introduced. At the time of switching, as indicated by arrow marks in FIG. 15, the first intake valve 8a increases the lift quantity while lagging the valve timing a little, and the second intake valve 8b advances the valve timing. Then, as indicated by a broken line in FIG. 15, the first intake valve 8a and the second intake valve 8b are made to have the same lift quantity and the same timing, thereby to perform the non-stratified combustion (refer to FIG. 5).

In this way, since the volume of the first intake port 5a is set as described above, only the combustion of one cycle of all of the cylinders after the switching request becomes the stratified combustion, and, thereafter, the fresh air flows through the first intake port 5a, so that the next and subsequent combustions will be the non-stratified combustion. As a result, the shifting from the stratified combustion to the non-stratified combustion can be effected without causing a response delay, and a misfire, torque fluctuations and fluctuations in the steps of torque.

Embodiment 5

In an embodiment 5, when the non-stratified combustion is performed in the state of low engine load wherein the EGR gas is not introduced, for example, as in the idling state, the first intake valve is maintained being closed by the variable valve mechanism. All other structures are the same with that of the embodiment 1, so that the description thereof will be omitted.

When the non-stratified combustion is performed in the state of low engine load wherein the EGR gas is not introduced, for example, as in the idling state, it is desirable to form the swirl flow in the combustion chamber 4 to stabilize the combustion. When switching is made from the non-stratified combustion to the stratified combustion where the EGR gas is introduced, it is desirable to suppress causing of steps of torque, which might have been caused by steps produced in the quantity of the air-fuel mixture between before and after the switching.

Thus, when the non-stratified combustion is performed in the state of low engine load wherein the EGR gas is not introduced, for example, as in the idling state, the first intake valve 8a is maintained being closed by the variable valve mechanism 10.

Figure 16:
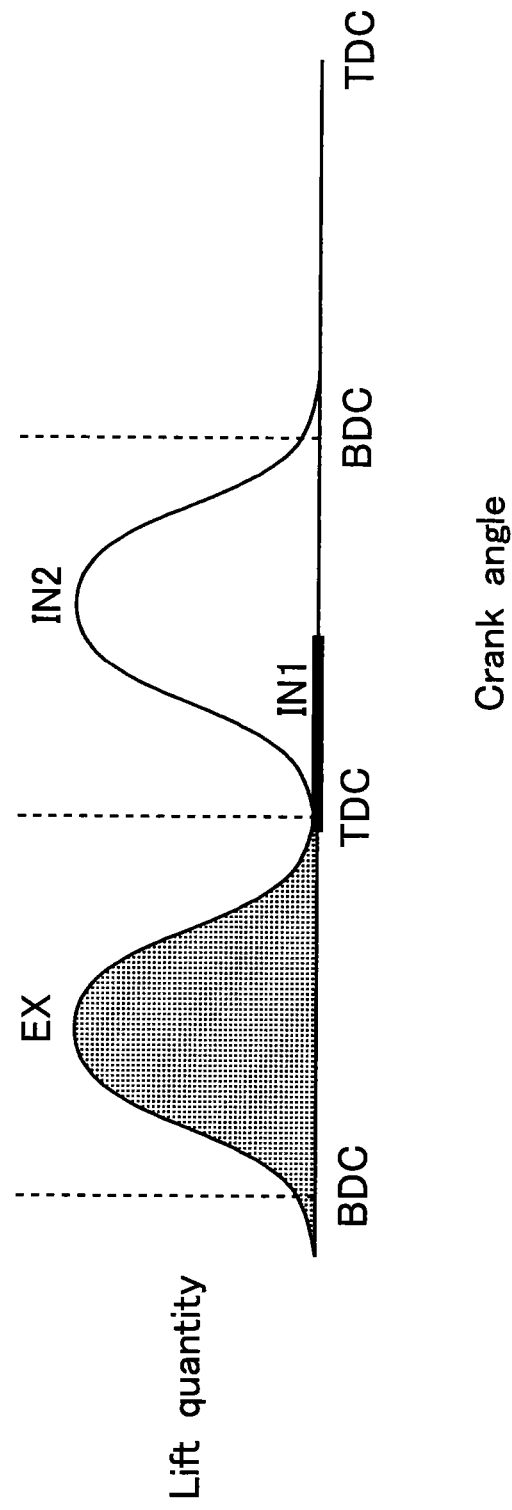
[FIG. 16] A diagram showing an example of valve timing of the intake valve and the exhaust valve at the time of non-stratified combustion according to an Embodiment 5.

Specifically, when the non-stratified combustion is performed, the fresh air is not supercharged by the compressor 16a, the fresh air blocking valve 13 is closed to block inflow of the fresh air into the first intake port 5a, and, at the same time, the EGR valve 24 is opened to allow the EGR gas to flow into the first intake port 5a. Then, as shown in FIG. 16, the first intake valve 8a is maintained being closed by the variable valve mechanism 10, and the second intake valve 8b is opened. FIG. 16 is a diagram showing an example of valve timing of the intake valve and the exhaust valve at the time of non-stratified combustion in the state of low engine load where the EGR gas is not introduced. Further, the first fuel injection valve 11a provided in the first intake port 5a is paused, and the fuel is injected only from the second fuel injection valve 11b provided in the second take port 5b. Thereby, the air-fuel mixture comprising the fresh air and the fuel is to flow through the second intake port 5b.

The ECU 26 that performs such controls corresponds to the control unit of the present invention.

Whereby, when the non-stratified combustion is performed in the state of low engine load of the internal combustion engine 1 wherein the EGR gas is not introduced, the second intake valve 8b, which is one of the intake valves, is opened to allow the air-fuel mixture to flow into the combustion chamber. Consequently, a strong swirl flow can be formed in the combustion chamber 4 and the combustion is stabilized.

Then, when switching is made from the non-stratified combustion to the stratified combustion wherein the EGR gas is introduced, the first intake valve 8a is opened to allow inflow of the EGR gas from the first intake port 5a, and, at the same time, the second intake valve 8b is opened, the same as was before the switching to allow inflow of the air-fuel mixture in the same quantity from the second intake port 5b. At this time, the valve opening time of the first intake valve 8a by the variable valve mechanism 10 is slightly advanced, and, at the same time, the valve opening time of the second intake valve 8b is lagged, so that the second intake valve 8b is opened about the time when the first intake valve 8a is closed. Hence, the quantity of the air-fuel mixture supplied to the combustion chamber 4 is not changed between before and after the switching, so that the shifting from the non-stratified combustion to the stratified combustion can be effected without causing steps in torque.

The above-described respective embodiments may be combined to varieties in as many as possible. Further, the combustion control apparatus for the internal combustion engine according to the present invention is not limited to the above-described embodiments, but various modifications may be added within the scope of not deviating from the gist of the present invention.

DESCRIPTION OF REFERENCE NUMERALS AND SYMBOLS

1: internal combustion engine
2: cylinder
3: piston
4: combustion chamber
5a: first intake port
5b: second intake port
6a: first exhaust port
6b: second exhaust port
7: spark plug
8a: first intake valve
8b: second intake valve
9a: first exhaust valve
9b: second exhaust valve
10: variable valve mechanism
11: fuel injection valve
11a: first fuel injection valve
11b: second fuel injection valve
12: EGR gas supply port
13: fresh air blocking valve
14: intake pipe
15: exhaust pipe
16: turbocharger
16a: compressor
16b: turbine
16c: waste gate valve
17: throttle valve
18: intercooler
19: surge tank
20: pressure sensor
21: oxidation catalyst
22: EGR apparatus
23: EGR passage
24: EGR valve
25: EGR cooler
26: ECU
27: crank position sensor
28: Accelerator opening degree sensor

The invention claimed is:

1. A combustion control apparatus for an internal combustion engine comprising:
a first intake passage and a second intake passage respectively and independently connected with a combustion chamber defined by at least one cylinder of the internal combustion engine, and which supply an intake air to the combustion chamber;
an EGR apparatus that circulates an EGR gas comprising a part of an exhaust gas into an EGR gas supply port provided at the first intake passage, from an exhaust passage of the internal combustion engine;
a fresh air blocking unit that blocks inflow of fresh air to the first intake passage;
a supercharger that supercharges fresh air at the upstream of the first intake passage and the second intake passage;
an opening and closing property changing unit that differentiates the timing of opening of a valve between a first intake valve that controls the intake air which inflows into the combustion chamber from the first intake passage, and a second intake valve that controls intake air which inflows into the combustion chamber from the second intake passage; and
a control unit that, in response to a decision by the control unit to perform a stratified combustion in the combustion chamber where the EGR gas is introduced to the combustion chamber and when the intake air flowing through the second intake passage is allowed to flow into the combustion chamber during a compression stroke, controls
to supercharge the fresh air by the supercharger,
to block inflows of the fresh air into the first intake passage by the fresh air blocking unit, and
to open the first intake valve before opening of the second intake valve by the opening and closing property changing unit, and, thereafter, to open the second intake valve.

2. The combustion control apparatus for the internal combustion engine according to claim 1, wherein
the control unit increases a supercharging pressure for supercharging the fresh air by the supercharger to a pressure higher than an inner pressure of the at least one cylinder of the internal combustion engine between a period from closing of the first intake valve to closing of the second intake valve.

3. The combustion control apparatus for the internal combustion engine according to claim 1, wherein
the supercharger is a turbocharger, and
the EGR apparatus comprises an EGR passage which connects the exhaust passage at the downstream of a turbine of the turbocharger with the EGR gas supply port.

4. The combustion control apparatus for the internal combustion engine according to claim 1, wherein
the first intake passage and the second intake passage are each a helical port or a tangential port to form the intake air flowed into the combustion chamber in the form of a swirl flow in the same direction.

5. The combustion control apparatus for the internal combustion engine according to claim 1, wherein
the control unit controls at least one of, during the stratified combustion in the combustion chamber where an EGR gas is introduced to the combustion chamber and when the intake air flowing through the second intake passage is allowed to flow into the combustion chamber during a compression stroke, to supercharge the fresh air by the supercharger, to block inflows of the fresh air into the first intake passage by the fresh air blocking unit, to open the first intake valve before opening of the second intake valve, and, thereafter, to open the second intake valve, by the opening and closing property changing unit, and
the control unit controls, when it is not required to have the intake air flowing through the second intake passage flow into the combustion chamber in the compression stroke, to not supercharge the fresh air by the supercharger, to block inflow of the fresh air into the first intake passage by the fresh air blocking unit, to open the first intake valve before opening of the second intake valve, and, thereafter, to open the second intake valve, by the opening and closing property changing unit.

6. The combustion control apparatus for the internal combustion engine according to claim 1, wherein
the fresh air blocking unit switches the intake air to flow through the first intake passage to either the fresh air inflows from the upstream of the first intake passage or the EGR gas inflows from the EGR gas supply port.

7. The combustion control apparatus for the internal combustion engine according to claim 6, wherein
a volume of the first intake passage from the fresh air blocking unit to the combustion chamber is substantially equal to a quantity of the EGR gas supplied to the combustion chamber when the stratified combustion is performed by introducing the EGR gas in an operation state of either in a state where an engine load is high or in a state where an engine revolution speed is high;
the control unit, when switching from the stratified combustion to a non-stratified combustion where a requesting torque is high and the EGR gas is not introduced, switches the intake air to flow through the first intake passage to a fresh air inflows from the upstream of the first intake passage, by the fresh air blocking unit at the time when the at least one cylinder, which entered into an intake stroke first after the switching request, starts to flow the intake air into the combustion chamber, and, thereafter, from the time when a different one of the at least one cylinder has completed to flow the intake air into the combustion chamber, the opening and closing properties of the first intake valve and the second intake valve are changed by the opening and closing property changing unit.

8. The combustion control apparatus for the internal combustion engine according to claim 1, wherein
the control unit controls, at the time of performing the non-stratified combustion in a state of low engine load where the EGR gas is not introduced, to have the opening closing property changing unit maintain the first intake valve in the closed state.

* * * * *